(12) United States Patent
Yamaguchi et al.

(10) Patent No.: US 6,256,346 B1
(45) Date of Patent: Jul. 3, 2001

(54) VIDEO ENCODING AND DECODING APPARATUS

(75) Inventors: Noboru Yamaguchi, Yashio; Toshiaki Watanabe, Yokohama; Takashi Ida, Kawasaki, all of (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/334,769

(22) Filed: Jun. 16, 1999

Related U.S. Application Data

(62) Division of application No. 09/111,751, filed on Jul. 8, 1998, now Pat. No. 6,028,634, which is a division of application No. 08/738,934, filed on Oct. 24, 1996, now Pat. No. 5,818,531.

(30) Foreign Application Priority Data

Oct. 27, 1995 (JP) .................................................. 7-281029
Jun. 14, 1996 (JP) .................................................. 8-154296

(51) Int. Cl.$^7$ ...................................................... H04N 7/32
(52) U.S. Cl. ................................. 375/240.12; 375/240.18
(58) Field of Search ........................... 348/390, 400–405, 348/407, 409–413, 415, 416, 419, 420, 699; 375/240, 242, 240.01, 240.12, 240.13, 240.14, 240.15, 240.16, 240.18, 240.2, 240.24; 382/232, 236, 238, 248, 250; H04N 7/32

(56) References Cited

U.S. PATENT DOCUMENTS

| | | |
|---|---|---|
| 4,833,535 | 5/1989 | Ozeki et al. . |
| 4,969,039 | 11/1990 | Koga et al. . |
| 4,982,285 | 1/1991 | Sugiyama . |

(List continued on next page.)

FOREIGN PATENT DOCUMENTS

| | | |
|---|---|---|
| 0 589 504 | 3/1994 | (EP) . |
| 0 595 403 | 5/1994 | (EP) . |
| 0 644 695 | 3/1995 | (EP) . |
| WO 95/06563 | 4/1992 | (WO) . |

OTHER PUBLICATIONS

T.K. Tan, et al., "A Frequency Scalable Coding Scheme Employing Pyramid And Subband Techniques", IEEE Transactions On Circuits and Systems For Video Technology, vol. 4, No. 2, Apr. 1994, pps. 203–207.

T.K. Tan, et al., IEEE Transactions on Circuits and Systems for Video Technology, vol. 4, No. 2, pp. 203–207, "A Frequency Scalable Coding Scheme Employing Pyramid and Subband Techniques", Apr. 1, 1994.

H.G. Musmann, et al., European Transactions on Telecommunications and Related Technologies, vol. 4, No. 1, pp. 11–21, "Coding Algorithms and VLSI Implementations for Digital TV and HDTV Satellite Broadcasting", Jan. 1, 1993.

(List continued on next page.)

Primary Examiner—Richard Lee
(74) Attorney, Agent, or Firm—Oblon, Spivak, McClelland, Maier & Neustadt, P.C.

(57) ABSTRACT

An encoding apparatus includes an encoder for encoding an alpha-map signal for discriminating a background from an object of an input picture in motion compensation prediction (MV)+transform encoding which uses MV in a domain of each of N×N transform coefficients (n), a transform circuit for transforming Pf into n in accordance with the alpha-map signal, an inverse transform circuit for reconstructing Pf by inversely transforming n in accordance with the alpha-map signal, a selector for obtaining a motion compensation prediction value (p) in the mth layer (m=2 to M) by switching p in the mth layer and p in the (m−1)th layer for each n, the selector selecting p in the mth layer for n by which a quantized output (Q) in the (m−1)th layer is 0 and selecting p in the (m−1)th layer for n by which Q=1 or more, an adder for calculating a difference df between a prediction error signal in the mth layer and a dequantized output in the (m−1)th layer, and an encoder for encoding and outputting the quantized signal of df. This encoding apparatus realizes SNR scalability in M layers.

22 Claims, 14 Drawing Sheets

U.S. PATENT DOCUMENTS

| | | | |
|---|---|---|---|
| 5,001,561 | | 3/1991 | Haskell et al. . |
| 5,337,049 | | 8/1994 | Shimoda . |
| 5,420,638 | | 5/1995 | Riglet et al. . |
| 5,592,228 | | 1/1997 | Dachiku et al. . |
| 5,686,956 | * | 11/1997 | Oh et al. .......................... 375/240.16 |
| 5,767,911 | | 6/1998 | Boon . |
| 5,805,221 | | 9/1998 | Lee . |
| 5,812,787 | | 9/1998 | Astle . |
| 5,883,678 | * | 3/1999 | Yamaguchi et al. .................. 348/390 |
| 5,978,514 | * | 11/1999 | Yamaguchi et al. .................. 348/404 |

OTHER PUBLICATIONS

L. Vandendorpe, Signal Processing: Image Communication, vol. 4, No. 3, pp. 245–262, "Hierarchical Transform and Subband Coding of Video Signals*", Jun. 1, 1992.

P.J. Tourtier, et al., Signal Processing: Image Communication, vol. 4, No. 4/5, pp. 325–344, "Motion Compensated Subband Coding Schemes for Compatible High Definition TV Coding", Aug. 1, 1992.

Proceedings of PCSJ88, 7–4, pp. 93–94, "An Adaptive Prediction Coding using Background Prediction" ; Y. MIYAMOTO, et al.; 1998.

Proceeding of PCSJ88, 8–2. pp. 117–118, "DCT Coding with 4 Types of Adaptive Prediction" ; T. WATANABE, et al.; 1998.

* cited by examiner

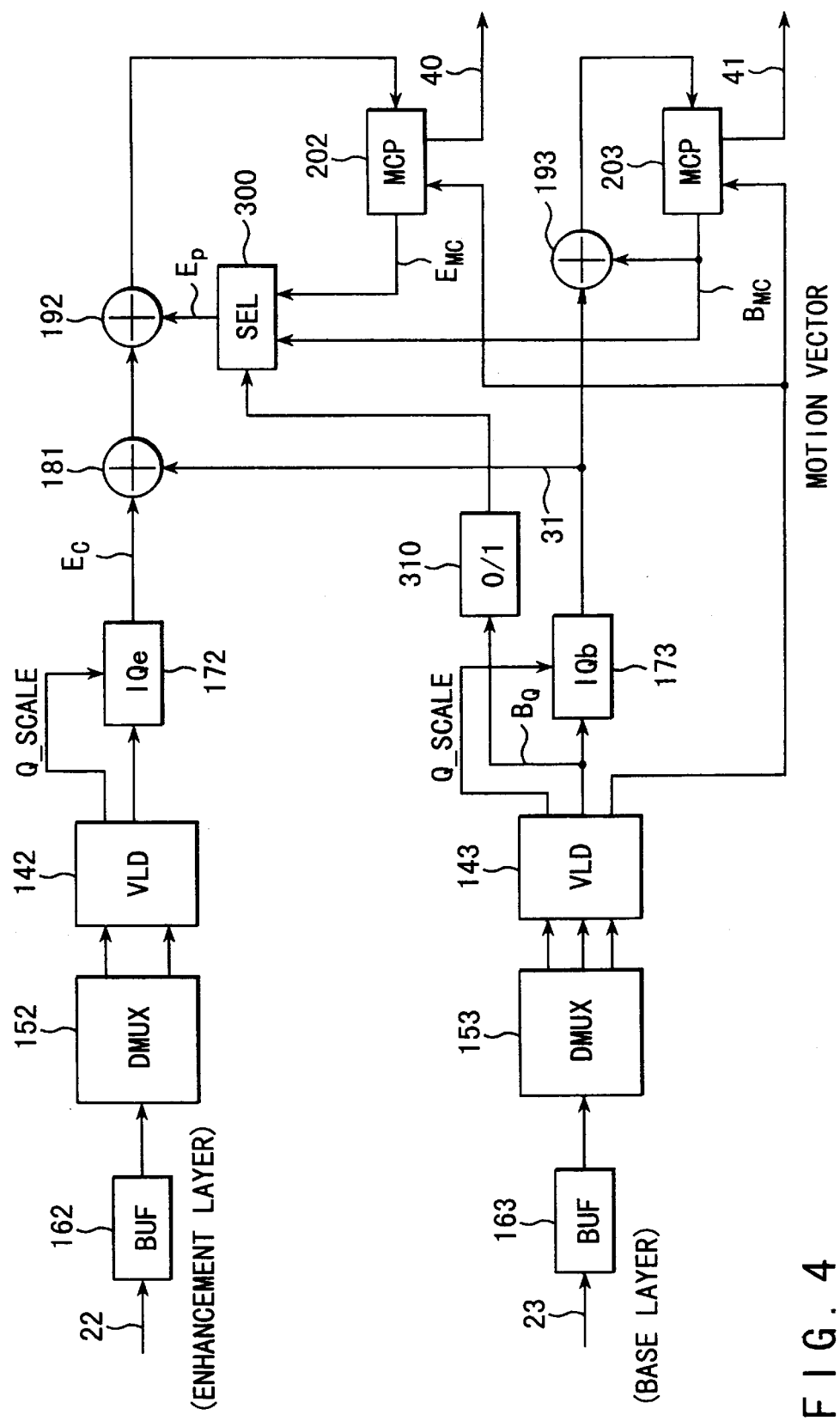
F I G. 4

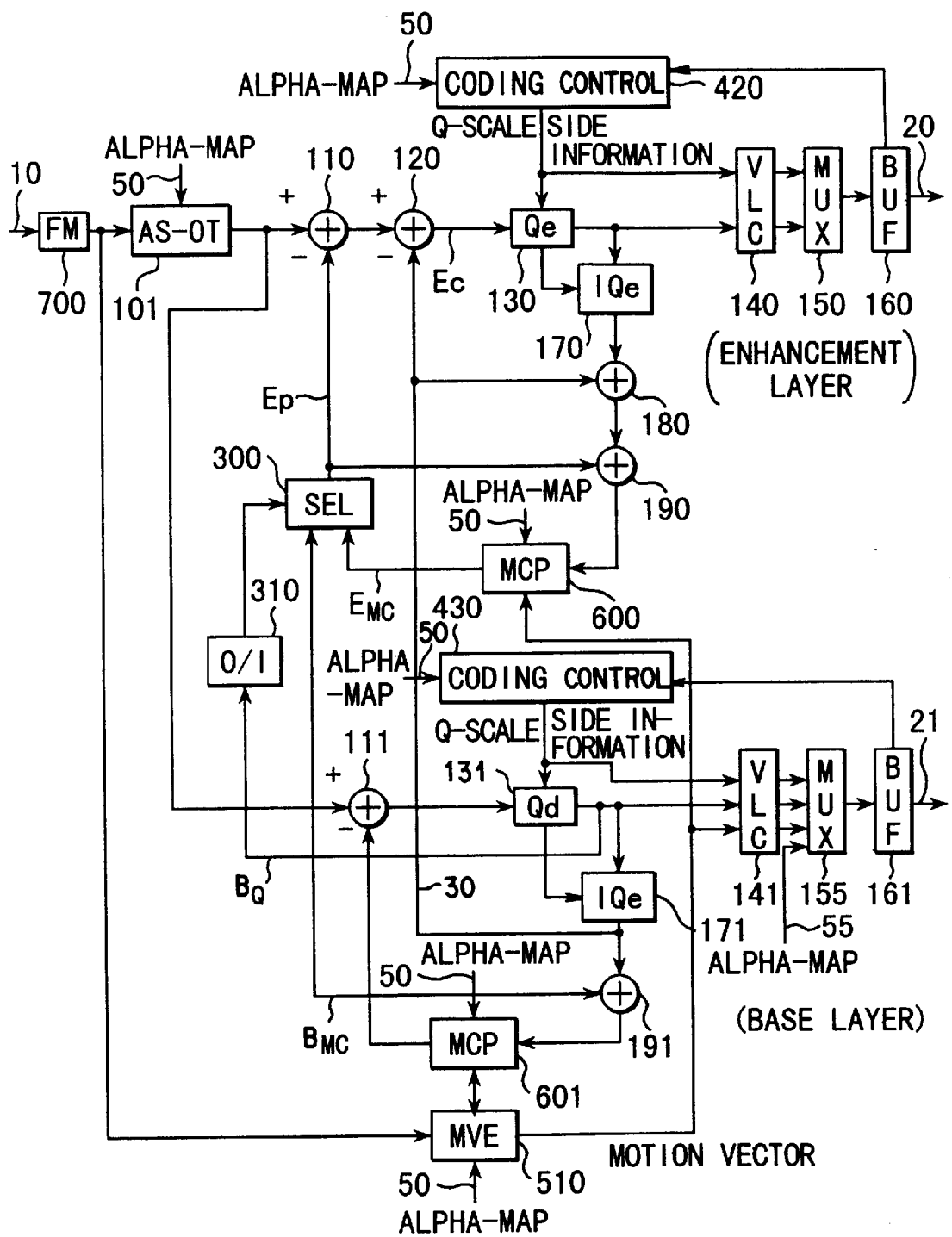
F I G. 5

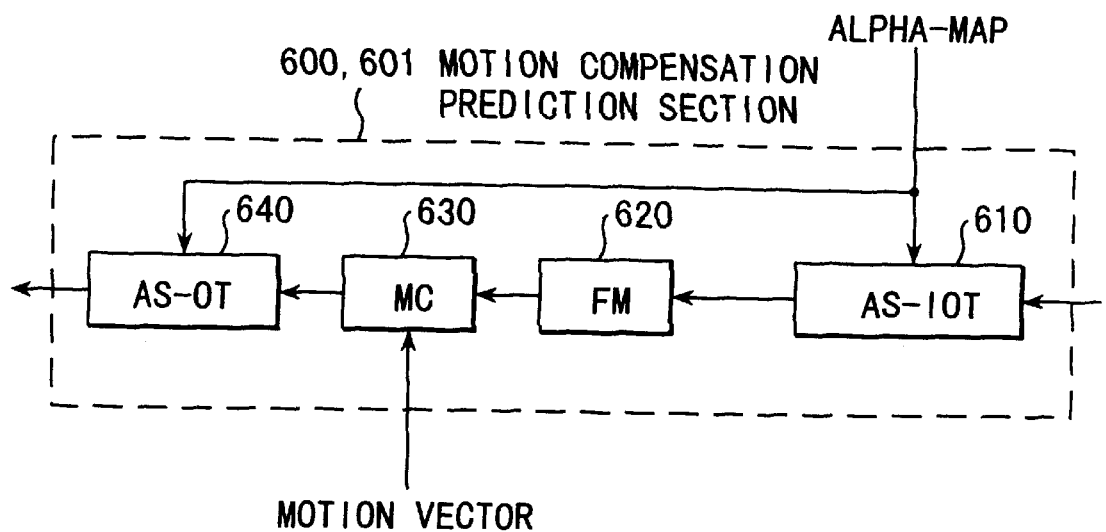
F I G. 6A
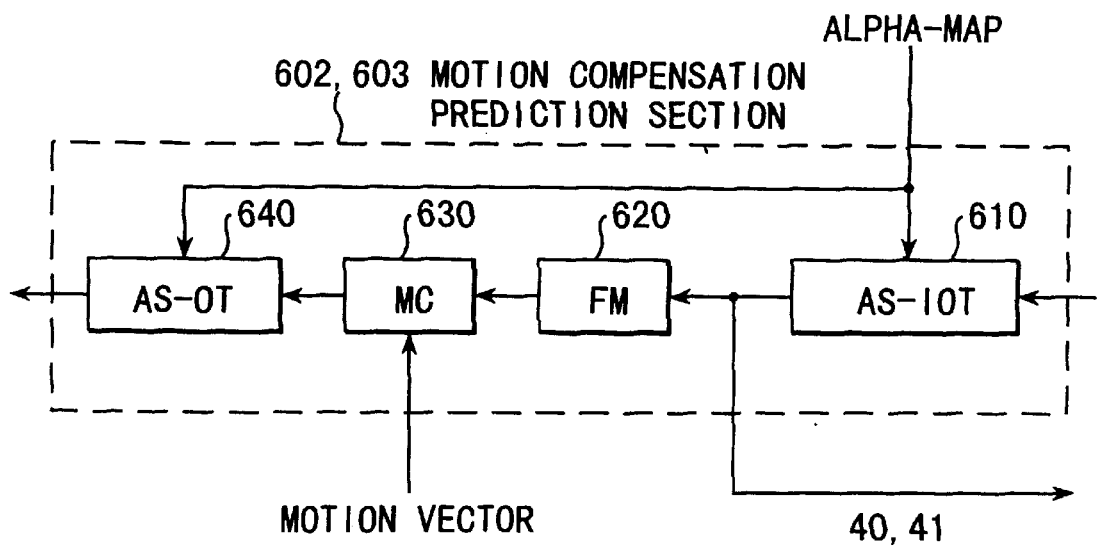
F I G. 6B

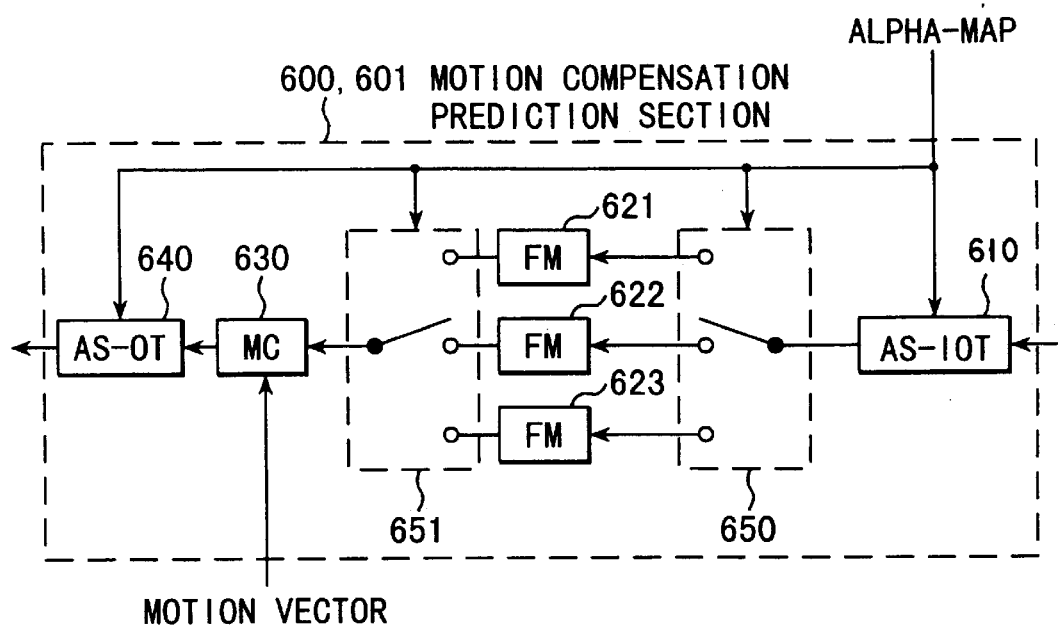
F I G. 8A
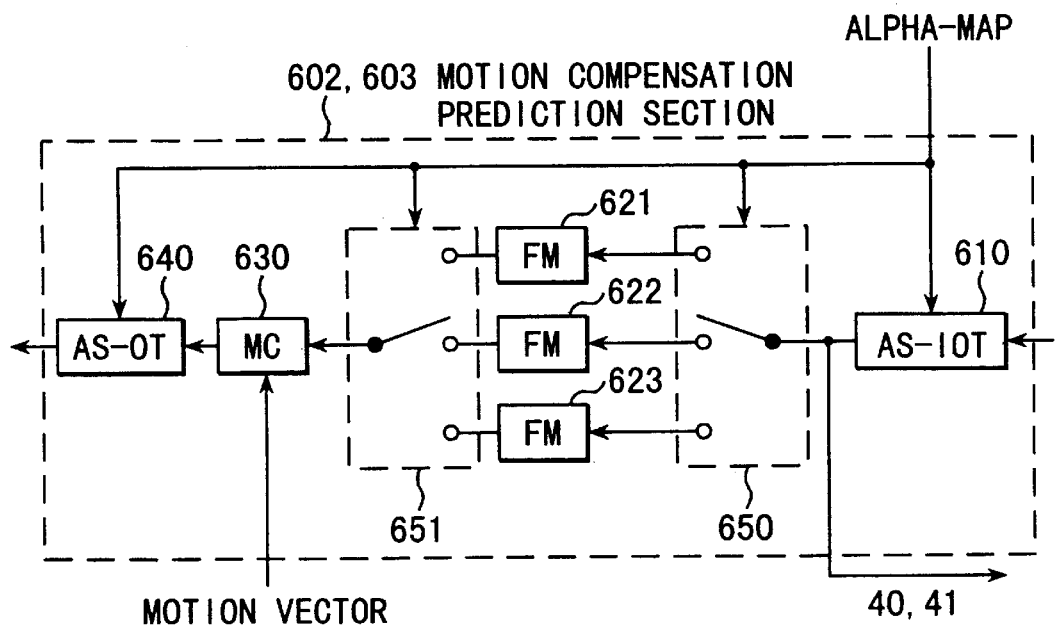
F I G. 8B

QUANTIZATION MATRIX OF INTRABLOCK

| v \ h | 1 | 2 | 3 | 4 | 5 | 6 | 7 | 8 |
|---|---|---|---|---|---|---|---|---|
| 1 | 8 | 16 | 19 | 22 | 26 | 27 | 29 | 34 |
| 2 | 16 | 16 | 22 | 24 | 27 | 29 | 34 | 37 |
| 3 | 19 | 22 | 26 | 27 | 29 | 34 | 34 | 38 |
| 4 | 22 | 22 | 26 | 27 | 29 | 34 | 37 | 40 |
| 5 | 22 | 26 | 27 | 29 | 32 | 35 | 40 | 48 |
| 6 | 26 | 27 | 29 | 32 | 35 | 40 | 48 | 58 |
| 7 | 26 | 27 | 29 | 34 | 38 | 46 | 56 | 69 |
| 8 | 27 | 29 | 35 | 38 | 46 | 56 | 69 | 83 |

FIG. 9

QUANTIZATION MATRIX OF INTERBLOCK

| v \ h | 1 | 2 | 3 | 4 | 5 | 6 | 7 | 8 |
|---|---|---|---|---|---|---|---|---|
| 1 | 16 | 17 | 18 | 19 | 20 | 21 | 22 | 23 |
| 2 | 17 | 18 | 19 | 20 | 21 | 22 | 23 | 24 |
| 3 | 18 | 19 | 20 | 21 | 22 | 23 | 24 | 25 |
| 4 | 19 | 20 | 21 | 22 | 23 | 24 | 26 | 27 |
| 5 | 20 | 21 | 22 | 23 | 25 | 26 | 27 | 28 |
| 6 | 21 | 22 | 23 | 24 | 26 | 27 | 28 | 30 |
| 7 | 22 | 23 | 24 | 26 | 27 | 28 | 30 | 31 |
| 8 | 23 | 24 | 25 | 27 | 28 | 30 | 31 | 33 |

FIG. 10

EXAMPLE OF QUANTIZATION MATRIX IN ENHANCEMENT LAYER

| v \ h | 1 | 2 | 3 | 4 | 5 | 6 | 7 | 8 |
|---|---|---|---|---|---|---|---|---|
| 1 | (16) | 16 | (18) | 16 | 16 | 16 | 16 | 16 |
| 2 | 16 | (18) | 16 | 16 | 16 | 16 | 16 | 16 |
| 3 | (18) | 16 | 16 | 16 | 16 | 16 | 16 | 16 |
| 4 | 16 | 16 | 16 | 16 | 16 | 16 | 16 | 16 |
| 5 | 16 | 16 | 16 | 16 | 16 | 16 | 16 | 16 |
| 6 | 16 | 16 | 16 | 16 | 16 | 16 | 16 | 16 |
| 7 | 16 | 16 | 16 | 16 | 16 | 16 | 16 | 16 |
| 8 | 16 | 16 | 16 | 16 | 16 | 16 | 16 | 16 |

FIG. 11

ZIGZAG SCAN

| h\v | 1 | 2 | 3 | 4 | 5 | 6 | 7 | 8 |
|---|---|---|---|---|---|---|---|---|
| 1 | 1 | 2 | 6 | 7 | 15 | 16 | 28 | 29 |
| 2 | 3 | 5 | 8 | 14 | 17 | 27 | 30 | 43 |
| 3 | 4 | 9 | 13 | 18 | 26 | 31 | 42 | 44 |
| 4 | 10 | 12 | 19 | 25 | 32 | 41 | 45 | 54 |
| 5 | 11 | 20 | 24 | 33 | 40 | 46 | 53 | 55 |
| 6 | 21 | 23 | 34 | 39 | 47 | 52 | 56 | 61 |
| 7 | 22 | 35 | 38 | 48 | 51 | 57 | 60 | 62 |
| 8 | 36 | 37 | 49 | 50 | 58 | 59 | 63 | 64 |

FIG. 12

EXAMPLE OF ADAPTIVE SCAN

| h\v | 1 | 2 | 3 | 4 | 5 | 6 | 7 | 8 |
|---|---|---|---|---|---|---|---|---|
| 1 | (1) | 5 | (4) | 7 | 15 | 16 | 28 | 29 |
| 2 | 6 | (3) | 8 | 14 | 17 | 27 | 30 | 43 |
| 3 | (2) | 9 | 13 | 18 | 26 | 31 | 42 | 44 |
| 4 | 10 | 12 | 19 | 25 | 32 | 41 | 45 | 54 |
| 5 | 11 | 20 | 24 | 33 | 40 | 46 | 53 | 55 |
| 6 | 21 | 23 | 34 | 39 | 47 | 52 | 56 | 61 |
| 7 | 22 | 35 | 38 | 48 | 51 | 57 | 60 | 62 |
| 8 | 36 | 37 | 49 | 50 | 58 | 59 | 63 | 64 |

FIG. 13

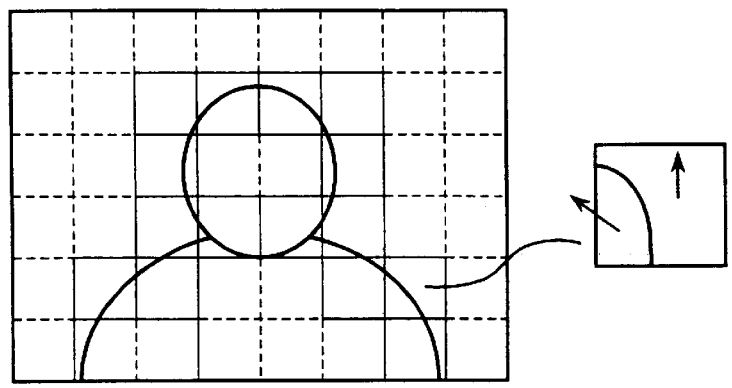
F I G. 14
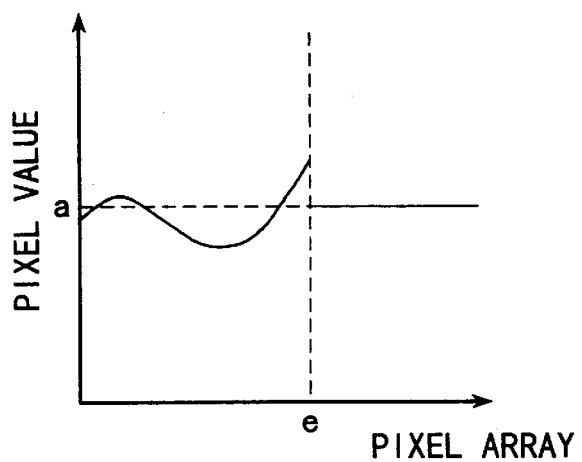
F I G. 16
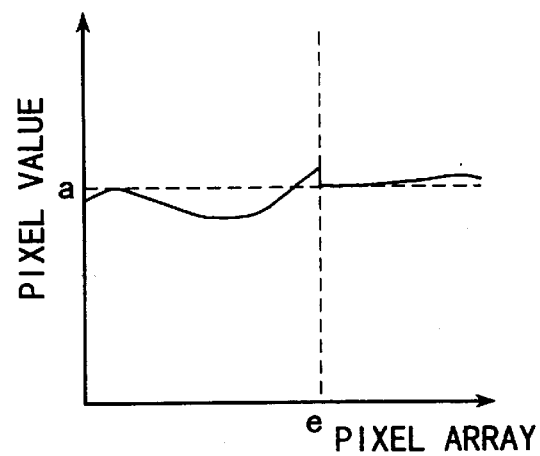
F I G. 17

FIG. 18

| a | a | a | a | a | a | a | a |
|---|---|---|---|---|---|---|---|
| a | a | a | a | a | a | a | a |
| a | a | a | a | a | a | a | $x_1$ |
| a | a | a | a | a | a | a | $x_2$ |
| a | a | a | a | a | $x_4$ | $x_3$ | $x_9$ |
| a | a | a | $x_6$ | $x_5$ | $x_{16}$ | $x_{13}$ | $x_{10}$ |
| a | a | $x_7$ | $x_{21}$ | $x_{19}$ | $x_{17}$ | $x_{14}$ | $x_{11}$ |
| a | $x_8$ | $x_{23}$ | $x_{22}$ | $x_{20}$ | $x_{18}$ | $x_{15}$ | $x_{12}$ |

FIG. 19

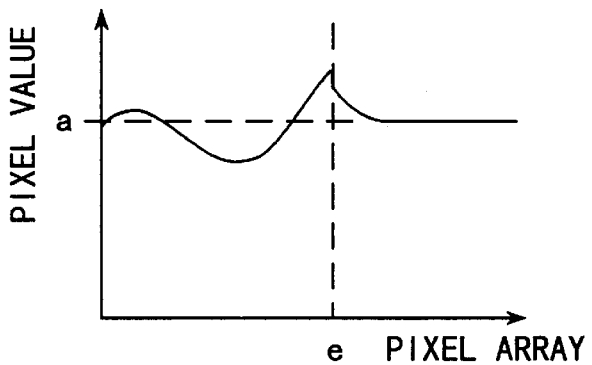

FIG. 20

| $a_{41}$ | $a_{39}$ | $a_{36}$ | $a_{32}$ | $a_{31}$ | $a_{25}$ | $a_{18}$ | $a_{10}$ |
|---|---|---|---|---|---|---|---|
| $a_{40}$ | $a_{37}$ | $a_{33}$ | $a_{27}$ | $a_{26}$ | $a_{19}$ | $a_{11}$ | $a_1$ |
| $a_{38}$ | $a_{34}$ | $a_{28}$ | $a_{21}$ | $a_{20}$ | $a_{12}$ | $a_2$ | $x_1$ |
| $a_{35}$ | $a_{29}$ | $a_{22}$ | $a_{14}$ | $a_{13}$ | $a_4$ | $a_3$ | $x_2$ |
| $a_{30}$ | $a_{23}$ | $a_{15}$ | $a_6$ | $a_5$ | $x_4$ | $x_3$ | $x_9$ |
| $a_{24}$ | $a_{16}$ | $a_7$ | $x_6$ | $x_5$ | $x_{16}$ | $x_{13}$ | $x_{10}$ |
| $a_{17}$ | $a_8$ | $x_7$ | $x_{21}$ | $x_{19}$ | $x_{17}$ | $x_{14}$ | $x_{11}$ |
| $a_9$ | $x_8$ | $x_{23}$ | $x_{22}$ | $x_{20}$ | $x_{18}$ | $x_{15}$ | $x_{12}$ |

VIDEO ENCODING AND DECODING APPARATUS

This application is a division of Ser. No. 09/111,751, filed Jul. 8, 1998, now U.S. Pat. No. 6,028,634, which is a division of Ser. No. 08/738,934, filed Oct. 24, 1996, now U.S. Pat. No. 5,818,531.

BACKGROUND OF THE INVENTION

1. Field of the Invention

The present invention relates to video encoding and decoding apparatuses for encoding a picture signal at a high efficiency and transmitting or storing the encoded signal and, more particularly, to video encoding and decoding apparatuses with a scalable function capable of scalable coding by which the resolution and the image quality can be changed into multiple layers.

2. Description of the Related Art

Generally, a picture signal is compression-encoded before being transmitted or stored because the signal has an enormous amount of information. To encode a picture signal at a high efficiency, pictures whose unit is a frame are divided into a plurality of blocks in units of a predetermined number of pixels. Orthogonal transform is performed for each block to separate the spacial frequency of a picture into frequency components. Each frequency component is obtained as a transform coefficient and encoded.

As one function of video encoding, a scalability function is demanded by which the image quality (SNR: Signal to Noise Ratio), the spacial resolution, and the time resolution can be changed step by step by partially decoding a bit stream.

The scalability function is incorporated into Video Part (IS13818-2) of MPEG2 which is standardized in ISO/IEC.

This scalability is realized by hierarchical encoding methods. The scalability includes an encoder and a decoder of SNR scalability and also includes an encoder and a decoder of spacial scalability.

In the encoder, layers are divided into a base layer (lower layer) whose image quality is low and an enhancement layer (upper layer) whose image quality is high.

In the base layer, data is encoded by MPEG1 or MPEG2. In the enhancement layer, the data encoded by the base layer is reconstructed and the reconstructed base layer data is subtracted from the enhancement layer data. Only the resulting error is quantized by a quantization step size smaller than the quantization step size in the base layer and encoded. That is, the data is more finely quantized and encoded. The resolution can be increased by adding the enhancement layer information to the base layer information, and this makes the transmission and storage of high-quality pictures feasible.

As described above, pictures are divided into the base layer and the enhancement layer, data encoded by the base layer is reconstructed, the reconstructed data is subtracted from the original data, and only the resulting error is quantized by a quantization step size smaller than the quantization step size in the base layer and encoded. Consequently, pictures can be encoded and decoded at a high resolution. This technique is called SNR scalability.

In the encoder, an input picture is supplied to the base layer and the enhancement layer. In the base layer, the input picture is so processed as to obtain an error from a motion compensation prediction value obtained from a picture of the previous frame, and the error is subjected to orthogonal transform (DCT). The transform coefficient is quantized and variable-length-decoded to obtain a base layer output. The quantized output is dequantized, subjected to inverse DCT, and added with the motion compensation prediction value of the previous frame, thereby obtaining a frame picture. Motion compensation prediction is performed on the basis of this frame picture to obtain the motion compensation prediction value of the previous frame.

In the enhancement layer, on the other hand, the input picture is delayed until the prediction value is obtained from the base layer, and processing is performed to obtain an error from a motion compensation prediction value in the enhancement layer obtained from the picture of the previous frame. The error is then subjected to orthogonal transform (DCT), and the transform coefficient is corrected by using the dequantized output from the base layer, quantized, and variable-length-decoded, thereby obtaining an enhancement layer output. The quantized output is dequantized, added with the motion compensation prediction value of the previous frame obtained in the base layer, and subjected to inverse DCT. A frame picture is obtained by adding to the result of the inverse DCT the motion compensation prediction value of the previous frame obtained in the enhancement layer. Motion compensation prediction is performed on the basis of this frame picture to obtain a motion compensation prediction value of the previous frame in the enhancement layer.

In this way, video pictures can be encoded by using the SNR scalability. Note that although this SNR scalability is expressed by two layers, various SNR reconstructed pictures can be obtained by increasing the number of layers.

In the decoder, the variable-length decoded data of the enhancement layer and the variable-length encoded data of the base layer which are separately supplied are separately variable-length-decoded and dequantized. The two dequantized data are added, and the result is subjected to inverse DCT. The picture signal is restored by adding the motion compensation prediction value of the previous frame to the result of the inverse DCT. Also, motion compensation prediction is performed on the basis of a picture in an immediately previous frame obtained from the restored picture signal, thereby obtaining a motion compensation prediction value of the previous frame.

The foregoing are examples of encoding and decoding using the SNR scalability.

On the other hand, the spacial scalability is done on the basis of the spacial resolution, and encoding is separately performed in a base layer whose spacial resolution is low and an enhancement layer whose spacial resolution is high. In the base layer, encoding is performed by using a normal MPEG2 encoding method. In the enhancement layer, up-sampling (in which a high-resolution picture is formed by adding pixels such as average values between pixels of a low-resolution picture) is performed for the picture from the base layer to thereby form a picture having the same size as the enhancement layer. Prediction is adaptively performed on the basis of motion compensation prediction using the picture of the enhancement layer and motion compensation prediction using the up-sampled picture. Consequently, encoding can be performed at a high efficiency.

The spacial scalability exists in order to achieve backward compatibility by which, for example, a portion of a bit stream of MPEG2 can be extracted and decoded by MPEG1. That is, the spacial scalability is not a function capable of reconstructing pictures with various resolutions (reference: "Special Edition MPEG", Television Magazine, Vol. 49, No. 4, pp. 458–463, 1995).

More specifically, the video encoding technology of MPEG2 aims to accomplish high-efficiency encoding of high-quality pictures and high-quality reconstruction of the encoded pictures. In this technology, pictures faithful to encoded pictures can be reconstructed.

Unfortunately, with the spread of multimedia, there is a demand for a reconstructing apparatus capable of fully decoding data of high-quality pictures encoded at a high efficiency, as a system on the reconstruction side. In addition, there are demands for a system such as a portable system which is only required to reconstruct pictures regardless of whether the image quality is high, and for a simplified system by which the system price is decreased.

To meet these demands, a picture is divided into, e.g., 8×8 pixel matrix blocks and DCT is performed in units of blocks. In this case, 8×8 transform coefficients are obtained. Although it is originally necessary to decode the data from the first low frequency component to the eighth low frequency component, the data is decoded from the first low frequency component to the fourth low frequency component or from the first low frequency component to the sixth low frequency component. In this manner decoding is simplified by restoring the picture by reconstructing the signal of 4×4 resolution or the signal of 6×6 resolution, rather than the signal of 8×8 resolution.

Unfortunately, when a picture which originally has 8×8 information is restored by using 4×4 or 6×6 information, a mismatch occurs between the restored value and the motion compensation prediction value, and errors are accumulated. This significantly degrades the picture. Therefore, it is an important subject to overcome this mismatch between the encoding side and the decoding side.

Note that as a method of converting the spacial resolution in order to control the difference between the spacial resolutions on the encoding side and the decoding side, there is another method, although the method is not standardized, by which the spacial resolution is made variable by inversely converting some coefficients of orthogonal transform (e.g., DCT (Discrete Cosine Transform)) by an order smaller than the original order.

Unfortunately, when motion compensation prediction is performed by using the resolution-converted picture, image quality degradation called a drift resulting from the motion compensation prediction occurs in the reconstructed picture (reference: Iwahashi et al., "Motion Compensation for Reducing Drift in Scalable Decoder", Shingaku Giho IE94–97, 1994).

Accordingly, the method has a problem as a technique to overcome the mismatch between the encoding side and the decoding side.

On the other hand, the spacial scalability exists in order to achieve backward compatibility by which, for example, a portion of a bit stream of MPEG2 can be extracted and decoded by MPEG1. That is, the spacial scalability is not a function of capable of reconstructing pictures with various resolutions (reference: "Special Edition MPEG", Television Magazine, Vol. 49, No. 4, pp. 458–463, 1995). Since hierarchical encoding is performed to realize the scalability function as described above, information is divisionally encoded and this decreases the coding efficiency.

A video encoding system belonging to a category called mid-level encoding is proposed in "J. Y. A. Wang et. al., "Applying Mid-level Vision Techniques for Video Data Compression and Manipulation", M.I.T. Media Lab. Tech. Report No. 263, February 1994".

In this system, a background and an object are separately encoded. To separately encode the background and the object, an alpha-map signal which represents the shape of the object and the position of the object in a frame is necessary. An alpha-map signal of the background can be uniquely obtained from the alpha-map signal of the object.

In an encoding system like this, a picture with an arbitrary shape must be encoded. As a method of encoding an arbitrary-shape picture, there is an arbitrary-shape picture signal orthogonal transform method described in previously filed Japanese Patent Application No. 7-97073. In this orthogonal transform method, the values of pixels contained in a specific domain are separated from an input edge block signal by a separation circuit (SEP), and an average value calculation circuit (AVE) calculates an average value a of the separated pixel values.

If an alpha-map indicates a pixel in the specific domain, a selector (SEL) outputs the pixel value in the specific domain stored in a block memory (MEM). If the alpha-map indicates another pixel, the selector outputs the average value a. The block signal thus processed is subjected to two-dimensional DCT to obtain transform coefficients for pixels in the specific domain.

On the other hand, inverse transform is accomplished by separating the pixel values in the specific domain from pixel values in the block obtained by performing inverse DCT for the transform coefficient.

As described above, in the scalable encoding method capable of dividing pictures into multiple layers, the coding efficiency is sometimes greatly decreased when video pictures are encoded. In addition, scalable encoding by which the resolution and the image quality can be made variable is also required in an arbitrary-shape picture encoding apparatus which separately encodes the background and the object. It is also necessary to improve the efficiency of motion compensation prediction encoding for an arbitrary-shape picture.

On the other hand, the mid-level encoding system has the advantage that a method of evenly arranging the internal average value of the object in the background can be realized with a few calculations. However, a step of pixel values is sometimes formed in the boundary between the object and the background. If DCT is performed in a case like this, a large quantity of high-frequency components are generated and so the amount of codes is not decreased.

SUMMARY OF THE INVENTION

It is an object of the present invention to provide an encoding apparatus and a decoding apparatus capable of improving the coding efficiency when video pictures are encoded by a scalable encoding method by which pictures can be divided into multiple layers.

It is another object of the present invention to provide a scalable encoding apparatus and a scalable decoding apparatus capable of making the resolution and the image quality variable and improving the coding efficiency in an arbitrary-shape picture encoding apparatus which separately encodes a background and an object.

It is still another object of the present invention to improve the efficiency of motion compensation prediction encoding for arbitrary-shape pictures.

It is still another object of the present invention to alleviate the drawback that the code amount is not decreased due to the generation of a large quantity of high-frequency components when DCT is performed, even if a step of pixel values is formed in the boundary between an object and a background when a method of evenly arranging an internal average value of the object in the background is used.

According to the present invention, there is provided a video encoding apparatus comprising: an orthogonal transform circuit for orthogonally transforming an input picture signal to obtain a plurality of transform coefficients; a first local decoder for outputting first transform coefficients for a fine motion compensation prediction picture on the basis of a previous picture; a second local decoder for outputting second transform coefficients for a coarse motion compensation prediction picture on the basis of a current picture corresponding to the input picture signal; means for detecting a degree of motion compensation prediction in the second local decoder; a selector for selectively outputting the first and second transform coefficients in accordance with the degree of motion compensation prediction; a first calculator for calculating a difference between the transform coefficients of the orthogonal transform circuit and ones of the first and second transform coefficients which are selected by the selector, and outputting a motion compensation prediction error signal; a first quantizer for quantizing the motion compensation prediction error signal from the first adder and outputting a first quantized motion compensation prediction error signal; a second calculator for calculating a difference between the second transform coefficients from the second local decoder and the transform coefficients from the orthogonal transform circuit, and outputting a second motion compensation prediction error signal; a second quantizer for quantizing the motion compensation prediction error signal from the second calculator, and outputting a second quantized motion compensation prediction error signal; and an encoder for encoding the first and second quantized motion compensation prediction error signals and outputting encoded signal.

According to the present invention, there is provided a video encoding apparatus comprising: an orthogonal transform circuit for dividing an input video signal into a plurality of blocks each containing N×N pixels and orthogonally transforming the input video signal in units of blocks to obtain a plurality of transform coefficients divided in spacial frequency bands; a first motion prediction processing section for performing motion compensation prediction processing for the plurality of transform coefficients in order to obtain an upper-layer motion compensation prediction signal having the number of data enough to obtain a high image quality; a second motion prediction processing section for performing motion compensation prediction processing for the plurality of transform coefficients in order to obtain a lower-layer motion compensation prediction signal upon reducing the number of data; a decision section for deciding in motion compensation on the basis of the lower-layer motion compensation prediction signal whether motion compensation prediction is correct; a selector for selecting the upper-layer motion compensation prediction signal in response to a decision representing a correct motion compensation prediction from the decision section, and the lower-layer motion compensation prediction signal in response to a decision representing an incorrect motion compensation prediction; and an encoder for encoding one of the upper-layer motion compensation prediction signal and the lower-layer motion compensation prediction signal which is selected by the selector.

According to the present invention, there is provided a video encoding apparatus for realizing SNR scalability in M layers, comprising: an orthogonal transform circuit for dividing an input video signal into a plurality of blocks each containing N×N pixels and orthogonally transforming the input video signal in units of blocks to obtain a plurality of transform coefficients divided in spacial frequency bands; a first motion compensation prediction processing section for performing motion compensation prediction processing for the plurality of transform coefficients in order to obtain an mth-layer (m=2 to M) motion compensation prediction signal; a second motion compensation prediction processing section for performing motion compensation prediction processing for the plurality of transform coefficients in order to obtain an (m−1)th-layer motion compensation prediction signal; switching means for selecting the mth-layer motion compensation prediction signal of the first motion compensation prediction processing section in order to obtain an mth-layer prediction value when a quantized output from the second motion compensation prediction processing section is 0, and switching between the mth-layer motion compensation prediction signal and the (m−1)th-layer motion compensation prediction signal in units of transform coefficients in order to select the (m−1)th-layer motion compensation prediction signal when the quantized output is not less than 1; means for calculating a difference signal between an (m−1)th-layer dequantized output from the second motion compensation prediction processing section and an mth-layer motion compensation prediction error signal obtained by a difference between the mth-layer motion compensation prediction signal and the transform coefficient from the orthogonal transform circuit; and encoding means for quantizing and encoding the difference signal to output an encoded bit stream.

According to the present invention, there is provided a video encoding/decoding system comprising: a video encoding apparatus for realizing SNR (Signal to Noise Ratio) scalability in M layers, which includes an orthogonal transform circuit for dividing an input video signal into a plurality of blocks each containing N×N pixels and orthogonally transforming the input video signal in units of blocks to obtain a plurality of transform coefficients divided in spacial frequency bands, a first motion compensation prediction processing section for performing motion compensation prediction processing for the plurality of transform coefficients in order to obtain an mth-layer (m=2 to M) motion compensation prediction signal, a second motion compensation prediction processing section for performing motion compensation prediction processing for the plurality of transform coefficients in order to obtain an (m−1)th-layer motion compensation prediction signal, switching means for selecting the mth-layer motion compensation prediction signal of the first motion compensation prediction processing section in order to obtain an mth-layer prediction value when a quantized output from the second motion compensation prediction processing section is 0, and switching between the mth-layer motion compensation prediction signal and the (m−1)th-layer motion compensation prediction signal in units of transform coefficients in order to select the (m−1)th-layer motion compensation prediction signal when the quantized output is not less than 1, means for calculating a difference signal between an (m−1)th-layer dequantized output from the second motion compensation prediction processing section and an mth-layer motion compensation prediction error signal obtained by a difference between the mth-layer motion compensation prediction signal and the transform coefficient from the orthogonal transform circuit, and encoding means for quantizing and encoding the difference signal to output an encoded bit stream; and a video decoding apparatus which includes means for extracting codes up to a code in the mth (m=2 to M) layer from the encoded bit stream from the video encoding apparatus, decoding means for decoding the codes of respective layers up to the mth layer, dequantization means for dequantizing, in the respective layers, the quantized values decoded by the decoding means, switching means for switching the mth-layer (m=2 to M) motion compensation prediction value and the (m−1)th-layer motion compensation prediction value in units of transform coefficients, and outputting the mth-layer motion compensation prediction value for the quantized output of 0 in the (m−1)th layer and the (m−1)th-layer motion compensation prediction value for the quantized output of not less than 1 in the (m−1)th layer in units of transform coefficients in order to obtain the mth-layer prediction value, and means for adding the mth-layer motion compensation prediction value and the (m−1)th-layer motion compensation prediction value to reconstruct the mth-layer motion compensation prediction error signal.

According to the present invention, there is provided a video encoding apparatus comprising: an orthogonal transform circuit for dividing an input video signal into a plurality of blocks each containing N×N pixels and orthogonally transforming an arbitrary-shape picture in units of blocks to obtain a plurality of transform coefficients; means for encoding and outputting an alpha-map signal for discriminating a background of a picture from an object thereof; means for calculating an average value of pixel values of an object portion using the alpha-map signal in units of blocks; means for assigning the average value to a background portion of the block; means for deciding using the alpha-map signal whether a pixel in the object is close to the background; means for compressing, about the average value, the pixel in the object decided to be close to the background; and means for orthogonally transforming each block to output an orthogonal transform coefficient.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 4 is a block diagram for explaining the present invention, showing the configuration of a decoding apparatus according to the first embodiment of the present invention;

FIG. 5 is a block diagram for explaining the present invention, showing the configuration of an encoding apparatus according to the second embodiment of the present invention;

FIGS. 6A and 6B are block diagrams for explaining the present invention, showing the configurations of motion compensation prediction sections according to the second embodiment of the present invention;

FIGS. 8A and 8B are block diagrams for explaining the present invention, showing the configurations of motion compensation prediction sections according to the third embodiment of the present invention;

FIG. 9 is a view for explaining the present invention, which illustrates an example of a quantization matrix used in the present invention;

FIG. 10 is a view for explaining the present invention, which illustrates an example of a quantization matrix used in the present invention;

FIG. 11 shows an example of a quantization matrix obtained for the example shown in FIG. 2;

FIG. 12 shows an example of a two-dimensional matrix which is divided into eight portions in each of a horizontal direction (h) and a vertical direction (v);

FIG. 13 shows a scan order for the example shown in FIG. 2;

FIG. 14 is a view for explaining the present invention, which explains the fourth embodiment of the present invention;

FIG. 16 is a view for explaining a modification of the second embodiment of the present invention, which is a graph showing an example in which an average value is arranged in a background;

FIG. 17 is a view for explaining another modification of the second embodiment of the present invention, which is a graph for explaining an example in which a step is decreased;

FIG. 18 is a view for explaining still another modification of the second embodiment of the present invention, which illustrates examples of block pixel values;

FIG. 19 is a view for explaining still another modification of the second embodiment of the present invention, which is a graph for explaining another example in which a step is decreased;

FIG. 20 is a view for explaining still another modification of the second embodiment of the present invention, which illustrates examples of block pixel values;

DETAILED DESCRIPTION OF THE PREFERRED EMBODIMENTS

In the present invention, when motion compensation is to be performed in a transform coefficient domain in units of N×N transform coefficients, encoding in an upper layer (enhancement layer) is performed on the basis of an already decoded and quantized value of a lower layer (base layer). This realizes an encoding system which can perform encoding with little decrease in the encoding coefficient.

Also, in the above encoding apparatus of the present invention, orthogonal transform can be performed for a picture domain with an arbitrary shape in accordance with an alpha-map signal indicating the arbitrary-shape picture domain. Consequently, a reconstructed picture with a variable image quality can be obtained for an arbitrary-shape picture.

In the present invention, a frame memory is prepared for each of a background and one or more objects, and motion compensation prediction is performed for each of the background and the objects. This improves the efficiency of prediction for a portion hidden by overlapping of the objects.

Furthermore, the efficiency of motion compensation predictive encoding is improved by decreasing the range of motion vector detection in the boundary of an object.

Embodiments of the present invention will be described below with reference to the accompanying drawings.

The first embodiment of the present invention will be described with reference to FIGS. 1, 2, 3A, 3B, and 4. This embodiment is related to an encoding apparatus and a decoding apparatus which realize SNR scalability of M layers as a whole. The coding efficiency in the mth layer is improved by adaptively switching a motion compensation prediction signal in the mth layer and a motion compensation prediction signal in the (m−1)th layer. In the accompanying drawings, a base layer corresponds to the (m−1)th layer and an enhancement layer corresponds to the mth layer.

Figure 1:
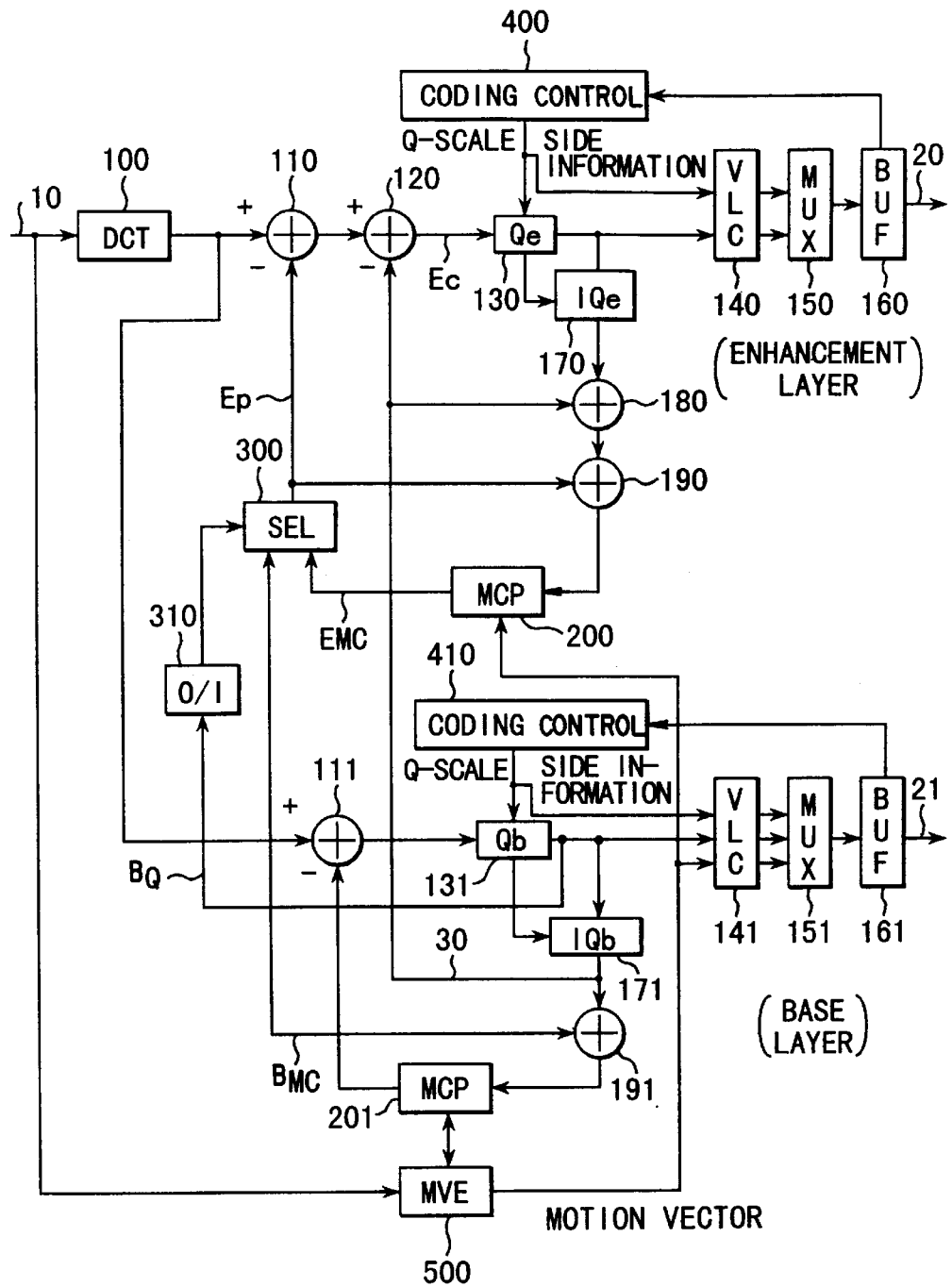
FIG. 1 is a block diagram for explaining the present invention, showing the configuration of an encoding apparatus according to the first embodiment of the present invention.

In the encoding apparatus shown in FIG. 1, an input signal is input to an orthogonal transform circuit, e.g., DCT circuit 100. The output terminal of the DCT circuit is connected to the input terminals of adders 110 and 111. The other input terminal of the adder 110 is connected to a selector 300. The output terminal of the adder 110 is connected to a quantizer 130 via an adder 120. The output terminal of the quantizer 140 is connected to an output buffer 160 via a variable-length encoder 140 and a multiplexer 150.

The output terminal of the quantizer 130 is connected to a motion compensation prediction section (MCP) 200 via a dequantizer 170 and adders 180 and 190. The output of the motion compensation prediction section 200 is connected selectively to the adders 110 and 120 by the selector 300. The encoding controller 400 controls the quantizer 130 and the variable-length encoder 140 in accordance with the output signal from the output buffer 160.

The output terminal of the adder 111 is connected to the input terminal of the quantizer 131 the output terminal of which is connected to is connected to the output buffer 161 via a variable-length encoder 141 and a multiplexer 151.

The output terminal of the quantizer 131 is connected to a motion compensation prediction section 201 of the enhancement layer via a dequantizer 171 and an adder 191. The output terminal of the motion compensation prediction section 201 is connected to the selector 300 and adders 111 and 191. The encoding controller 410 controls the quantizer 131 and the variable-length encoder 141 in accordance with the output signal from the output buffer 161. A motion vector detector 500 receives the input video signal 10 and is connected to the motion compensation prediction section 200, motion compensation prediction section 201 and variable-length encoder 141.

The DCT circuit 100 performs orthogonal transform (DCT) for an input picture signal 10 to obtain transform coefficients of individual frequency components. The adder 110 calculates the difference between the transform coefficient from the DCT circuit 100 and one of an output (EMC) from the enhancement layer motion compensation prediction section 200 and an output (BMC) from the base layer motion compensation prediction section 201 which are selectively supplied via the selector 300. The adder 120 calculates the difference between an output from the adder 110 and an output from the dequantizer 171.

The quantizer 130 quantizes an output from the adder 120 in accordance with a quantization scale supplied from the encoding controller 400. The variable-length encoder 140 performs variable-length encoding for the quantized output from the quantizer 130 and side information such as the quantization scale supplied from the encoding controller 400.

The multiplexer 150 multiplexes the variable-length code of the quantized output and the variable-length code of the side information supplied from the variable-length encoder 140. The output buffer 160 temporarily holds and outputs the data stream multiplexed by the multiplexer 150.

The encoding controller 400 outputs information of an optimum quantization scale Q_scale on the basis of buffer capacity information from the buffer 160. The encoding controller 400 also supplies this information of the quantization scale Q_scale to the variable-length encoder 140 as the side information, thereby causing the quantizer 130 to perform quantization and the variable-length encoder 140 to perform variable-length encoding.

The dequantizer 170 dequantizes the quantized output from the quantizer 130 and outputs the result. The adder 180 adds the output from the dequantizer 170 and the output from the dequantizer 171. The adder 190 adds the output from the adder 180 and a compensation prediction value selectively output from the selector 300.

The motion compensation prediction section 200 calculates a motion compensation prediction value in the enhancement layer on the basis of the output from the adder 180 and a motion vector detected by the motion vector detector 500. When receiving the motion compensation prediction value calculated by the motion compensation prediction section 200 and the motion compensation prediction value calculated by the motion compensation prediction section 201, the selector 300 selectively outputs one of these motion compensation prediction values in accordance with an output from a binarizing circuit 310.

In the above configuration, the adder 110, the adder 120, the quantizer 130, the variable-length encoder 140, the multiplexer 150, the output buffer 160, the dequantizer 170, the adder 180, the adder 190, the motion compensation prediction section 200, the selector 300, and the encoding controller 400 constitute the enhancement layer. The quantizer 170, the adder 180, the adder 190 and the motion compensation prediction section 200 construct a local decoder of the enhancement layer.

The motion vector detector 500 described above receives the same picture signal as the input picture signal to the DCT circuit 100 and detects a motion vector from this picture signal. On the basis of the motion vector supplied from the motion vector detector 500 and the sum output from the adder 191, the motion compensation prediction section 201 performs motion compensation prediction and obtains a motion compensation prediction value (BMC) which is converted into a DCT coefficient.

The adder 111 calculates the difference between the output transform coefficient from the DCT circuit 100 and the output motion compensation prediction value (BMC) from the motion compensation prediction section 201. The quantizer 131 quantizes the output from the adder 111 in accordance with the quantization scale designated by the encoding controller 410.

The binarizing circuit 310 checks whether the quantized value output from the quantizer 131 is "0". If the value is "0", the binarizing circuit 310 outputs "0". If the value is not "0", the binarizing circuit 310 outputs "1". The dequantizer 171 performs dequantization in accordance with the quantization scale designated by the encoding controller 410. The adder 191 adds the output from the dequantizer 171 and the output from the motion compensation prediction section 201 and supplies the sum to the motion compensation prediction section 201.

The variable-length encoder 141 performs variable-length encoding for the quantized output from the quantizer 131 and the side information such as the quantization scale supplied from the encoding controller 410. The multiplexer 151 multiplexes the variable-length code of the quantized output and the variable-length code of the side information supplied from the variable-length encoder 141. The output buffer 161 temporarily holds and outputs the data stream multiplexed by the multiplexer 151.

The encoding controller 410 outputs the information of the optimum quantization scale Q_scale on the basis of buffer capacity information from the buffer 161. The encoding controller 410 also supplies this information of the quantization scale Q_scale to the variable-length encoder 141 as the side information, thereby causing the quantizer 131 to perform quantization and the variable-length encoder 141 to perform variable-length encoding.

The adder 111, the quantizer 131, the variable-length encoder 141, the multiplexer 151, the output buffer 161, the dequantizer 171, the adder 191, the motion compensation prediction section 201, the binarizing circuit 310, the encoding controller 410, and the motion vector detector 500 constitute the base layer. The dequantizer 171, the adder 191 and the motion compensation prediction section 201 constitute a local decoder.

This apparatus with the above configuration operates as follows.

The input picture signal 10 is supplied to the DCT circuit 100 and the motion vector detector 500. The motion vector detector 500 detects a motion vector from the picture signal 10 and supplies the detected vector to the motion compensation prediction sections 200 and 201 and the variable-length encoder 141.

The picture signal 10 input to the DCT circuit 100 is divided into blocks each having a size of N×N pixels and orthogonally transformed in units of N×N pixels by this DCT circuit 100. Consequently, N×N transform coefficients are obtained for each block. These transform coefficients are N×N transform coefficients obtained by separating the spacial frequency components of the picture into components ranging from a DC component to individual AC components.

These N×N transform coefficients obtained by the DCT circuit 100 are supplied to the adder 110 in the enhancement layer and the adder 111 in the base layer.

In the base layer, the adder 111 calculates the difference between the transform coefficient and the motion compensation prediction value (BMC) which is converted into a DCT coefficient and supplied from the motion compensation prediction section 201, thereby obtaining a prediction error signal. This prediction error signal is supplied to the quantizer 131 to be quantized in accordance with the quantization scale Q_scale input by the encoding controller 410. The quantized prediction error signal is supplied to the variable-length encoder 141 and dequantizer 171.

The variable-length encoder 141 performs variable-length encoding for the quantized prediction error signal, the side information such as the quantization size supplied from the encoding controller 410, and the motion vector information supplied from the motion vector detector 500. This variable-length-encoded output is supplied to the multiplexer 151 to be multiplexed thereby, and supplied to the output buffer 161. The output buffer 161 outputs the multiplexed signal, as an encoded bit stream 21, to a transmission line or a storage medium. Also, the output buffer 161 feeds the capacity of the buffer back to the encoding controller 410.

In accordance with the capacity information from the buffer, the encoding controller 410 controls the output from the quantizer 131 and outputs the quantization scale Q_scale to the quantizer 131. This information of the quantization scale Q_scale is also supplied to the variable-length encoder 141 as the side information.

Since the encoding controller 410 controls the output from the quantizer 131 in accordance with the capacity information from the buffer, the encoding controller 410 can advance the quantization while controlling the quantization scale so that the output buffer 161 does not overflow.

The information of the quantization scale Q_scale is variable-length-encoded as the side information by the variable-length encoder 141 and multiplexed by the multiplexer 151. The multiplexed signal is used as the output from the video encoding apparatus. Consequently the quantization scale used in dequantization when the video decoding apparatus performs decoding can be obtained.

Meanwhile, the quantized value of the prediction error signal supplied to the dequantizer 171 is dequantized and supplied to the adder 191. The adder 191 adds the dequantized value to the motion compensation prediction value BMC and thereby calculates a reconstructed value in the transform coefficient domain. This value is supplied to the motion compensation prediction section 201.

In the enhancement layer, the output EMC from the motion compensation prediction section 200 of the enhancement layer and the output BMC from the motion compensation prediction section 201 of the base layer are adaptively and selectively output for each transform coefficient. That is, on the basis of an output BQ from the quantizer 131 in the base layer, the selector 300 adaptively and selectively outputs the output (EMC) from the motion compensation prediction section 200 of the enhancement layer and the output BMC from the motion compensation prediction section 201 of the base layer for each transform coefficient in accordance with a method to be described later.

The adder 110 calculates a prediction error signal between the transform coefficient of the input picture supplied from the DCT circuit 100 and an output EP from the selector 300 and supplies the signal to the adder 120. The adder 120 calculates the difference between a signal 30 of the dequantized value BQ supplied from the dequantizer 171 and the output from the adder 110 and supplies the difference as a difference value output signal EC to the quantizer 130. This difference value output signal EC is the motion compensation prediction error signal.

The quantizer 130 quantizes the difference value output signal EC in accordance with the quantization scale Q_scale supplied from the encoding controller 400 and supplies the quantized signal to the variable-length encoder 140 and the dequantizer 170.

The variable-length encoder 140 performs variable-length encoding for the quantized motion compensation prediction error signal together with the side information and supplies the encoded signals to the multiplexer 150. The multiplexer 150 multiplexes these signals and supplies the multiplexed signal to the output buffer 160.

The output buffer 160 outputs the multiplexed signal to a transmission line or a storage medium as an encoded bit stream 20 for the enhancement layer. Also, the output buffer 160 feeds the capacity of the buffer back to the encoding controller 400.

The quantized value supplied to the dequantizer 170 is dequantized. The adder 180 adds the dequantized value to the output 30 supplied from the dequantizer 171 of the base layer, thereby reconstructing the prediction error signal.

The adder 190 adds the prediction error signal reconstructed by the adder 180 to the motion compensation prediction value EMC and thereby calculates a reconstructed value in the transform coefficient domain. This reconstructed value is supplied to the motion compensation prediction section 200.

Figure 2:
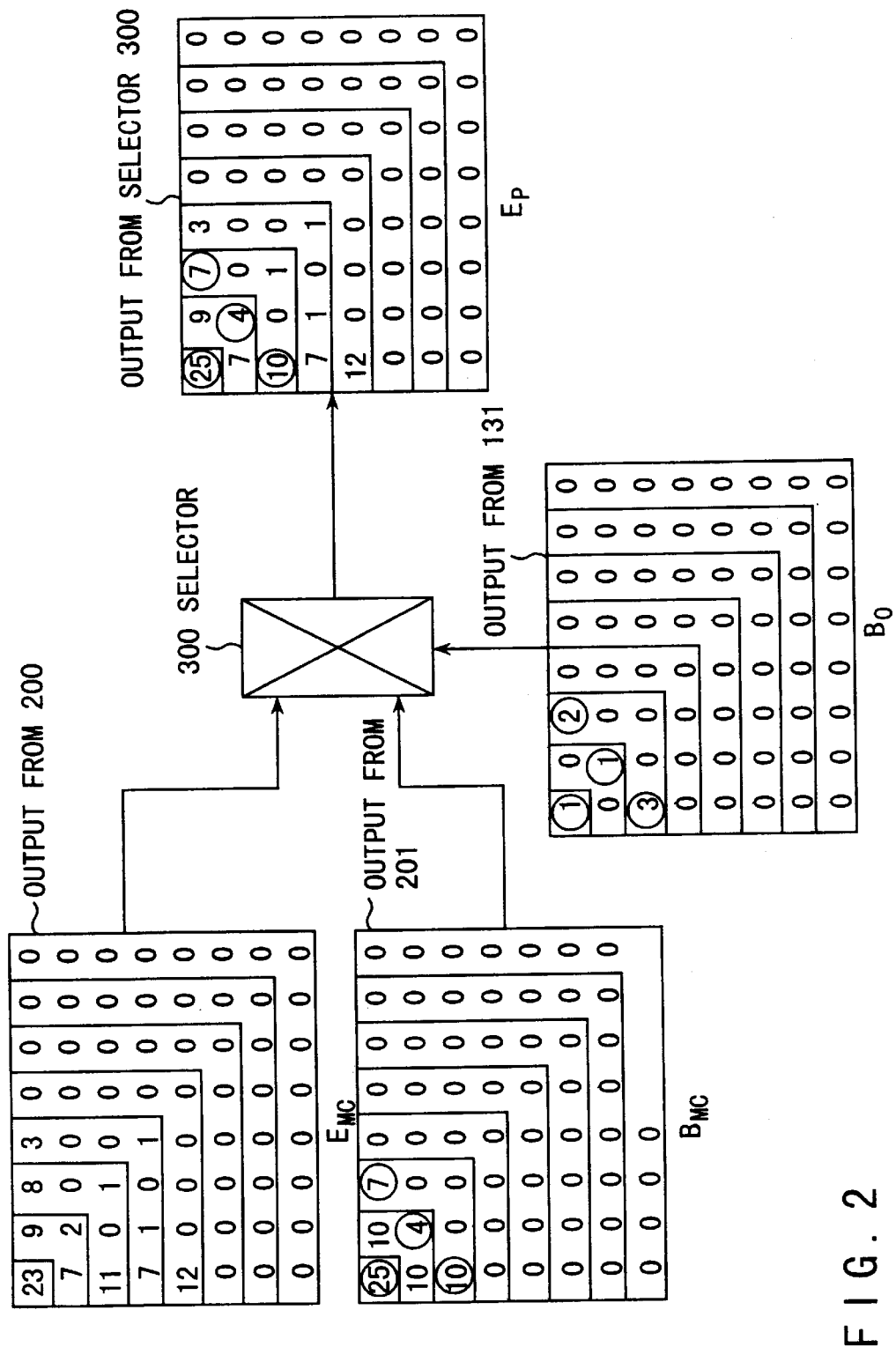
FIG. 2 is a view for explaining the present invention, which explains a prediction value switching method to be applied to the present invention.

FIG. 2 shows a switching unit described in reference (T. K. Tan et al., "A Frequency Scalable Coding Scheme Employing Pyramid and Subband Techniques", IEEE Trans. CAS for Video Technology, Vol. 4, No. 2, April 1994), which is an example of the switching unit optimally applicable to the selector 300.

Referring to FIG. 2, the binarizing circuit 310 decides whether the value of the output BQ from the quantizer 131 in the base layer is "0". This decision result is supplied to the selector 300. If the value of the output BQ from the quantizer 131 is "0", the selector 300 selects the transform coefficient output EMC from the enhancement layer motion compensation prediction section 200. If the value is "1", the selector 300 selects the transform coefficient output BMC from the base layer motion compensation prediction section 201.

That is, the binarizing circuit 310 outputs "0" when the value of the output BQ from the quantizer 131 in the base layer is "0" and outputs "1" when the value is not "0". Therefore, the selector 300 is made to select EMC when the output from the binarizing circuit 310 is "0" and BMC when the output is "1". Consequently, the transform coefficient output EMC from the motion compensation prediction section 200 in the enhancement layer is applied to a transform coefficient in a position where the output BQ from the quantizer 131 is "0", and the transform coefficient output BMC from the motion compensation prediction section 201 in the base layer is applied to a transform coefficient in a position where the output BQ from the quantizer 131 is not "0".

The quantizer 131 in the base layer receives the output from the adder 111 and quantizes this output from the adder 111. The adder 111 receives the output from the DCT circuit 100 and the motion compensation prediction value obtained by the motion compensation prediction section 201 from a picture in an immediately previous frame, and calculates the difference between them. Therefore, if the calculated motion compensation prediction value is correct, the difference between the two values output from the adder 111 is "0".

Accordingly, of the quantized values as the output BQ from the quantizer 131 in the base layer, coefficients (values in portions enclosed by the circles in FIG. 2) having values other than "0" are coefficients whose motion compensation prediction is incorrect.

If the motion compensation prediction section 200 performs notion compensation prediction by using the same motion vector as in the base layer supplied from the motion vector detector 500, it is estimated that motion compensation prediction for coefficients (values in portions enclosed by the circles) in the enhancement layer in the same positions as in the base layer is incorrect.

Accordingly, the selector 300 selects BMC for these coefficients.

On the other hand, it is estimated that motion compensation for other coefficients is correct. Therefore, the selector 300 selects a prediction value in the enhancement layer with a smaller encoding deviation. Consequently, the signal EC encoded in the enhancement layer is used as the quantized error signal of the base layer when motion compensation prediction is incorrect, and as the motion compensation prediction error signal of the enhancement layer when motion compensation prediction is correct. This improves the coding efficiency of coefficients whose motion compensation prediction is incorrect.

Note that the technique disclosed in the reference cited above is based on the assumption that pictures having low resolutions are reconstructed in the base layer, and so low-frequency coefficients which are ¼ the transform coefficients calculated by the DCT circuit 100 are separated and supplied to the base layer. As a consequence, the reliability of estimation for switching prediction for each transform coefficient is decreased due to an error produced by resolution conversion.

In this embodiment, on the other hand, the resolutions of the base layer and the enhancement layer are equal. Therefore, the embodiment is different from the technique disclosed in the reference cited above in that the accuracy of estimation is improved. A great advantage of the embodiment is a high image quality.

The configuration of the motion compensation prediction sections 200 and 201 used in the apparatus of the present invention will be described below.

Figure 3A:
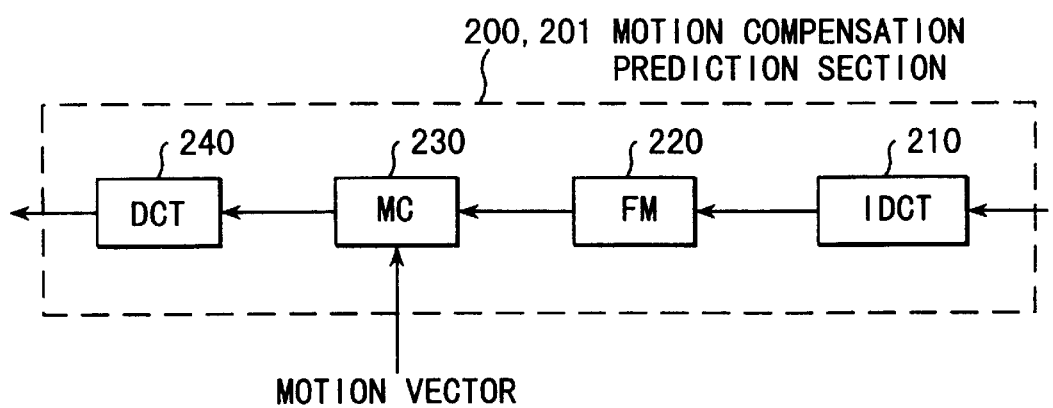
FIGS. 3A and 3B are block diagrams for explaining the present invention, showing the configurations of motion compensation prediction sections according to the first embodiment of the present invention.

FIG. 3A is a block diagram showing the configuration of the motion compensation prediction sections 200 and 201. Each of the motion compensation prediction sections 200 and 201 consists of an IDCT circuit 210, a frame memory 220, a motion compensation circuit 230, and a DCT circuit 240.

The IDCT circuit 210 restores the reconstructed picture signal by performing inverse orthogonal transform (IDCT) for the output from the adder 190 or 191. The frame memory 220 holds the reconstructed picture signal obtained by this inverse orthogonal transform, as a reference picture, in units of frames. The motion compensation circuit 230 extracts a picture in a position indicated by a motion vector in units of blocks from the picture signals (reference pictures) stored in the frame memory 220. The DCT circuit 240 performs orthogonal transform (DCT) for the extracted picture and outputs the result. Note that the motion vector is supplied from the motion vector detector 500. In this configuration, a reconstructed value in a transform coefficient domain is inversely transformed into the reconstructed picture signal by the IDCT circuit 210 and stored in the frame memory 220. The motion compensation circuit 230 extracts a picture in a position indicated by the motion vector in units of blocks from the reference pictures stored in the frame memory 220, and supplies the extracted picture to the DCT circuit 240. The DCT circuit 240 performs DCT for the supplied picture and outputs the result as a motion compensation prediction value in the DCT coefficient domain.

In this manner, the motion compensation prediction value in the DCT coefficient domain can be obtained.

The foregoing is the explanation of the encoding apparatus. The decoding apparatus will be described below.

FIG. 4 is a block diagram of the decoding apparatus according to the first embodiment of the present invention.

According to the present decoding apparatus, a buffer 162 on the enhancement layer side receives a coded bit stream sent from the encoding apparatus. The output terminal of the buffer 162 is connected to variable-length encoder 142 via a demultiplexer 152 the output terminal of which is connected to a dequantizer 172. The output terminal of the dequantizer 172 is connected to a motion compensation prediction section 202 via adders 181 and 192. The output terminal of the motion compensation prediction section 202 is connected an adder 192 via a selector 300.

The buffer 163 on the base layer side receives the encoded bit stream 23 sent from the encoding apparatus. The output terminal of the buffer 163 is connected to a variable-length decoder 143 via a segmentation circuit 153. The output terminal of the variable-length decoder 143 is connected to a motion compensation prediction section 203 via a dequantizer 173 and an adder 193 and to the switch control terminal of a selector 300 via a binarizing circuit 310. The output terminal of the motion compensation prediction section 203 is connected to an adder 193 and the selector 300.

The input buffer 162, the demultiplexer 152, the variable-length decoder 142, the dequantizer 172, the adders 181 and 192, the selector 300, and the motion compensation prediction section 202 constitute an enhancement layer. The input buffer 163, the demultiplexer 153, the variable-length decoder 143, the dequantizer 173, the adder 193, the binarizing circuit 310, and the motion compensation prediction section 203 constitute a base layer.

The input buffer 162 in the enhancement layer receives and temporarily holds an encoded multiplexed bit stream 22 in the enhancement layer. The demultiplexer 152 demultiplexes the bit stream 22 obtained via the input buffer 162, i.e., demultiplexes the multiplexed signal into the original signals, thereby restoring encoded information of side information and encoded information of a difference value output signal EC of a picture.

The variable-length decoder 142 performs variable-length decoding for the encoded signals demultiplexed by the demultiplexer 152 to thereby restore the original side information and the difference value output signal EC of the picture. On the basis of the information of a quantization scale Q_scale of the restored side information, the dequantizer 172 dequantizes the difference value output signal EC of the picture from the variable-length decoder 142 and outputs the dequantized signal. The adder 181 adds the dequantized signal and the dequantized output from the dequantizer 173 for the base layer.

The adder 192 adds the output from the adder 181 and the output EP from the selector 300 and outputs the sum. The motion compensation prediction section 202 receives the output from the adder 192 and the decoded difference value output signal EC of the picture which is the output from the variable-length decoder 143 for the base layer and obtains a motion compensation prediction value EMC. The output motion compensation prediction value EMC from the motion compensation prediction section 202 is used as an enhancement layer output 40 and as one input to the selector 300.

The selector 300 receives the output (motion compensation prediction value EMC) from the motion compensation prediction section 202 for the enhancement layer and the output from the motion compensation prediction section 203 for the base layer. In accordance with the output from the binarizing circuit 310, the selector 300 selectively outputs one of these two inputs.

The input buffer 163 receives and temporarily holds an encoded and multiplexed bit stream 23 for the base layer.

The demultiplexer 153 demultiplexes the bit stream 23 obtained via the input buffer 163, i.e., demultiplexes the multiplexed signal into the original signals, thereby restoring encoded information of the side information and encoded information of the difference value output signal EC of the picture.

The variable-length decoder 143 performs variable-length decoding for the encoded signals demultiplexed by the demultiplexer 153 to thereby restore the original side information and the difference value output signal EC of the picture. On the basis of the information of the quantization scale Q_scale of the restored side information, the dequantizer 173 dequantizes the difference value output signal EC of the picture from the variable-length decoder 143 and supplies the dequantized signal to the adders 181 and 193. The adder 193 adds the dequantized signal and the motion compensation prediction value EMC supplied from the motion compensation prediction section 203 for the base layer.

The motion compensation prediction section 203 receives the output from the adder 193 and the motion compensation prediction value EMC, which is the output of an immediately previous frame from the section 203, and obtains the motion compensation prediction value EMC of the current frame. The output motion compensation prediction value EMC from the motion compensation prediction section 203 is used as an output 41 of the base layer and as the other input to the selector 300.

The operation of the decoding apparatus with the above configuration will be described below. In this apparatus, the base layer bit stream 23 is supplied to the input buffer 163 and the enhancement layer bit stream 22 is supplied to the input buffer 162.

The input base layer bit stream 23 is stored in the input buffer 163 and supplied to the demultiplexer 153. The demultiplexer 153 demultiplexes the signal in accordance with the type of the signal. That is, the bit stream 23 is formed by multiplexing signals of the side information such as the quantized value of a transform coefficient, the motion vector, and the quantization scale. Upon receiving the bit stream 23, therefore, the demultiplexer 153 demultiplexes the bit stream into the original codes such as the quantized value of the transform coefficient, the motion vector, and the quantization scale Q_scale in the side information.

The codes demultiplexed by the demultiplexer 153 are supplied to the variable-length decoder 143 and decoded into signals of the quantized value of the transform coefficient, the motion vector, and the quantization scale Q_scale. Of the decoded signals, the motion vector is supplied to the motion compensation prediction section 203, and the quantized value of the transform coefficient and the quantization scale Q_scale are supplied to the dequantizer 173. The dequantizer 173 dequantizes the quantized value of the transform coefficient in accordance with the quantization scale Q_scale and supplies the dequantized transform coefficient to the adder 193.

The adder 193 adds the dequantized transform coefficient and the motion compensation prediction value in the transform coefficient domain supplied from the motion compensation prediction section 203, thereby calculating the reconstructed value in the transform coefficient domain.

Figure 3B:
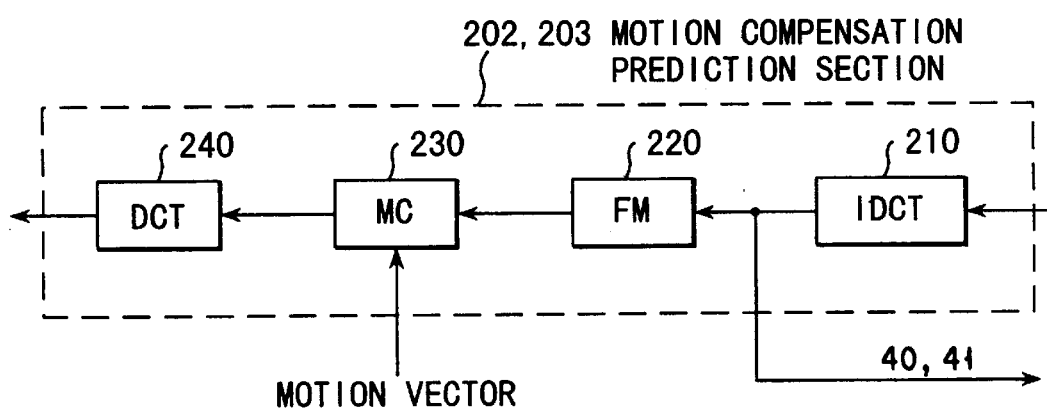

This reconstructed value is supplied to the motion compensation prediction section 203. The configuration of the motion compensation prediction section 203 is as shown in FIG. 3B. That is, the reconstructed value supplied from the adder 193 is inversely orthogonally transformed by an IDCT circuit 210 in the motion compensation prediction section 203 and output as the reconstructed picture signal 41. The signal is also stored in a frame memory 220 in the motion compensation prediction section 203.

In the motion compensation prediction section 203, on the basis of the supplied motion vector described above, a motion compensation circuit 230 extracts a picture in a position indicated by the motion vector in units of blocks from the picture signals (reference pictures) stored in the frame memory 220. A DCT circuit 240 performs orthogonal transform (DCT) for the extracted picture and outputs the result as a transform coefficient output BMC to the adder 193 and the selector 300.

Meanwhile, the enhancement layer bit stream 22 is supplied to the enhancement layer. This bit stream 22 is stored in the enhancement layer input buffer 162 and supplied to the demultiplexer 152.

The demultiplexer 152 demultiplexes the bit stream 22. That is, the bit stream 22 is formed by multiplexing signals of the side information such as the quantized value of a transform coefficient, the motion vector, and the quantization scale Q_scale. Upon receiving the bit stream 22, therefore, the demultiplexer 152 demultiplexes the bit stream into the original codes such as the quantized value of the transform coefficient, the motion vector, and the quantization scale Q_scale.

The codes demultiplexed by the demultiplexer 152 are supplied to the variable-length decoder 142 and decoded into signals of the quantized value of the transform coefficient, the motion vector, and the like. Of the decoded signals, the motion vector is supplied to the motion compensation prediction section 202, and the quantized value of the transform coefficient and the quantization scale Q_scale are supplied to the dequantizer 172. The dequantizer 172 dequantizes the quantized value of the transform coefficient in correspondence with the quantization scale Q_scale and supplies the dequantized transform coefficient to the adder 181. The dequantized value is added to a dequantized value 31 of the base layer supplied from the dequantizer 173, and the sum is supplier to the adder 192.

The adder 193 adds the output from the adder 181 and a signal EP supplied from the selector 300 to thereby calculate the reconstructed value in the transform coefficient domain. This reconstructed value is supplied to the motion compensation prediction section 202. The configuration of the motion compensation prediction section 202 is as shown in FIG. 3B. That is, the reconstructed value supplied from the adder 193 is inversely orthogonally transformed by an IDCT circuit 210 in the motion compensation prediction section 202 and output as a reconstructed picture signal 40. The signal is also stored in a frame memory 220 in the motion compensation prediction section 202.

In the motion compensation prediction section 202, on the basis of the supplied motion vector described above a motion compensation circuit 230 extracts a picture in a position indicated by the motion vector in units of blocks from the picture signals (reference pictures) stored in the frame memory 220. A DCT circuit 240 performs orthogonal transform (DCT) for the extracted picture and outputs the result as a transform coefficient output BMC to the adder 193 and the selector 300.

The selector 300 receives the decision result from the binarizing circuit 310 and selects one of BMC and EMC. That is, the binarizing circuit 310 receives an output BQ from the variable-length decoder 143 and decides whether the value is "0". This decision result is supplied to the selector 300.

If the value of the output BQ from the variable-length decoder 143 is "0", the selector selects the transform coefficient output EMC from the motion compensation prediction section 202. If the value is "1", the selector 300 selects the transform coefficient output BMC from the motion compensation prediction section 203.

That is, the binarizing circuit 310 outputs "0" when the value of the output BQ from the variable-length decoder 143 in the base layer is "0" and outputs "1" when the value is not "0". Therefore, the selector 300 is made to select EMC when the output from the binarizing circuit 310 is "0" and BMC when the output is "1". Consequently, the transform coefficient output EMC from the motion compensation prediction section 202 in the enhancement layer is applied to a transform coefficient in a position where the output BQ from the variable-length decoder 143 is "0", and the transform coefficient output BMC from the motion compensation prediction section 203 in the base layer is applied to a transform coefficient in a position where the output BQ from the variable-length decoder 143 is not "0".

The output from the variable-length decoder 143 in the base layer contains the motion compensation prediction error signal and the motion vector obtained on the encoding side. When the motion compensation prediction error signal and the motion vector are supplied to the motion compensation prediction section 203, the motion compensation prediction section 203 obtains the motion compensation prediction error between the picture of the immediately previous frame and the current picture.

Meanwhile, the binarizing circuit 310 receives the decoded base layer motion compensation prediction value signal from the variable-length decoder 143. If the signal value is "0", the binarizing circuit 310 outputs "0" to the selector 300. If the signal value is not "0", the binarizing circuit 310 outputs "1" to the selector 300.

If the output from the binarizing circuit 310 is "0", the selector 300 selects the output EMC with a smaller encoding deviation from the enhancement layer motion compensation prediction section 203. If the output from the binarizing circuit 310 is "1", the selector 300 selects the transform coefficient output BMC with a larger encoding deviation from the base layer motion compensation prediction section 202.

Eventually, if the DCT coefficient error obtained by the base layer motion compensation prediction is "0", the output from the motion compensation prediction section 202 which is the reconstructed value of the transform coefficient output EMC from the enhancement layer motion compensation prediction section 200 is selected. If the error is "1", the output from the motion compensation prediction section 203 which is the reconstructed value of the transform coefficient output BMC from the base layer motion compensation prediction section 201 is selected.

This processing is analogous to the processing in the encoding apparatus. Accordingly, as the transform coefficient output of motion compensation prediction in the enhancement layer, as in the selection done on the encoding side, an output for the base layer is used in a portion where motion compensation prediction is incorrect, and an output for the enhancement layer with a smaller encoding deviation is used in a portion where the prediction is correct. Consequently, following this switching the encoding apparatus can smoothly reconstruct pictures.

In the first embodiment described above, each frame of a video picture is divided into matrix blocks each having a predetermined number (N×N) of pixels and orthogonally transformed to obtain transform coefficients of individual spacial frequency bands. For each of the N×N transform coefficients thus obtained, motion compensation is performed in the domain of the transform coefficient in upper and lower layers. When motion compensation is to be performed in this video encoding, whether motion compensation prediction is correct is checked on the basis of an already decoded and quantized value in the lower layer (base layer). If the motion compensation prediction is correct, the upper layer (enhancement layer) is encoded by using a motion compensation prediction value with a smaller encoding deviation obtained for the upper layer. If the motion compensation prediction is incorrect, the upper layer is encoded by using a motion compensation prediction value obtained for the lower layer (base layer) and having a larger encoding deviation than that for the enhancement layer. This improves the coding efficiency of a coefficient the motion compensation prediction for which is incorrect and thereby realizes an encoding system capable of encoding with little decrease in the coding efficiency.

The foregoing is an embodiment in which a whole video picture is efficiently encoded in the scalable encoding method. An embodiment in which the present invention is applied to arbitrary-shape picture encoding by which a background and an object in a video picture are separately encoded will be described below. This second embodiment of the present invention will be described with reference to FIGS. 5, 6A, 6B, and 7. In this embodiment, the technique of the first embodiment is applied to pictures having arbitrary shapes represented by alpha-map signals.

FIG. 5 shows an encoding apparatus of the present invention as the second embodiment. The basic configuration of this encoding apparatus is the same as the encoding apparatus explained in the first embodiment. Accordingly, the same reference numerals as in the configurations shown in FIGS. 1 and 4 denote the same parts and a detailed description thereof will be omitted.

This configuration differs from FIG. 1 in eight points; that is, an arbitrary shape orthogonal transform circuit 101 is provided instead of the DCT circuit 100, inputs are received via a frame memory 700, an encoding controller 420 is provided instead of the encoding controller 400, an encoding controller 430 is provided instead of the encoding controller 410, a motion compensation prediction section 600 is provided instead of the motion compensation prediction section 200 for an enhancement layer, a motion compensation prediction section 601 is provided instead of the motion compensation prediction section 201, a motion vector detector 510 is provided instead of the motion vector detector 500, and a multiplexer 155 is provided instead of the multiplexer 151.

The frame memory 700 temporarily holds an input picture signal in units of frames. The arbitrary shape orthogonal transform circuit 101 extracts an object region from the pictures stored in the frame memory 700 by referring to a separately supplied alpha-map. The circuit 101 divides the rectangle region including the object region into blocks of a predetermined pixel size and performs DCT for each block.

The encoding controller 420 refers to the alpha-map and generates a quantization scale Q_scale, which gives an enhancement layer optimum quantization scale to output buffer capacity information from an output buffer 160, and side information. The encoding circuit 430 refers to the alpha-map and generates a quantization scale Q_scale, which gives a base layer optimum quantization scale and side information to output buffer capacity information from an output buffer 161, and side information.

The motion compensation prediction section 600 refers to the alpha-map and performs motion compensation prediction for a picture in the interest region part on the basis of a reconstructed value in a transform coefficient domain supplied from an adder 190 and a reconstructed value in an immediately previous frame. The motion compensation prediction section 601 refers to the alpha-map and performs motion compensation prediction for the picture in the interest region part on the basis of a reconstructed value in the transform coefficient domain supplied from an adder 191 and the reconstructed value in the immediately previous frame.

The motion vector detector 510 refers to the alpha-map and detects a motion vector in the picture in the interest region part from the pictures stored in the frame memory 700.

The multiplexer 155 is provided for the base layer. The multiplexer 155 multiplexes a variable-length code of a prediction error signal from a variable-length encoder 141, a variable-length code of side information such as mode information containing quantization scale information, a variable-length code of a motion vector, and a code (alpha-code) of a separately supplied alpha-map, and supplies the multiplexed signal to the output buffer 161.

In this apparatus with the above configuration, an input picture signal 10 is temporarily stored in the frame memory 700 and read out to the arbitrary shape orthogonal transform circuit 101 and the motion vector detector 510. In addition to the picture signal 10, an alpha-map signal 50 which is a map information signal for distinguishing a background portion from an object portion in a picture is input to the arbitrary shape orthogonal transform circuit 101.

This alpha-map signal can be acquired by applying, e.g., a chromakey technique. For example, in the case of an alpha-map for distinguishing a person (object) from a background, the image of the person is taken by the chromakey technique and binarized to obtain a bit-map picture in which the person image region is "1" and the background region is "0". This picture can be used as an alpha-map.

The arbitrary-shape orthogonal transform circuit 101 refers to this alpha-map signal, checks where the object region of the picture is, divides the rectangle region including the object region into square blocks each consisting of N×N pixels, and orthogonally transforms each block to obtain N×N transform coefficients. As a technique to orthogonally transform an arbitrary-shape region of a picture by using an alpha-map, it is only necessary to use a technique established by the present inventors and disclosed in above-mentioned Japanese Patent Application No. 7-97073 which is already filed.

Although the explanation of the operation of the encoding apparatus according to the second embodiment has not finished, processing of decreasing a step will be described below as a modification.

In the method of the second embodiment described above, the average value of the object is arranged in the background. In addition to this processing, if pixel values of the object are compressed around the average value by a predetermined scaling coefficient, the step of a pixel value in the boundary between the object and the background can be decreased. Details of this processing will be described below.

To decrease the step of a pixel value in the boundary between the object and the background, pixel values of the object are compressed around the average value by a predetermined scaling coefficient. Examples of the method are illustrated in FIGS. 16 and 17. Although actual pictures are two-dimensional signals, one-dimensional signals are shown for simplicity. In these drawings, a pixel value is plotted on the ordinate, and a pixel row is plotted on the abscissa. The left-hand side of the position of a pixel row e is an object region, and the right-hand side is a background region. FIG. 16 shows a state in which a pixel value average value a of the object is arranged in the background portion.

FIG. 17 shows the result of compression around the pixel value average value a. Assuming the luminance before the compression is x and the luminance after the compression is y, the luminance y after the compression can be represented by where c is a constant between "0" and "1".

$$y = c \times (x-a) + a$$

Compression can be performed for all pixels x1 to x23 in an object shown in FIG. 18. However, the step can also be decreased by compressing only the pixels x1 to x8 in the object close to the boundary to the background portion. Although an additional arithmetic operation is necessary to check whether a pixel is close to the boundary, the method has the advantage that the pixels x9 to x23 in the object not in contact with the boundary to the background are kept unchanged.

In this modification, it is decided that, of pixels in the object, those in contact with the background in any of the upper, lower, left, and right portions are pixels close to the boundary.

The foregoing is the modification by which pixel values in the object are compressed around the average value by a predetermined scaling coefficient in order to decrease the step of a pixel value in the boundary between the object and the background. However, the step of a pixel value in the boundary between the object and the background can also be decreased by processing the background portion. This modification will be described below.

FIG. 19 shows the modification of processing the background portion. In this modification, of pixels in the background, the values of pixels close to the object region are so altered as to decrease the step. A practical example is shown in FIG. 20. Referring to FIG. 20, xn (n=1 to 23) indicates a pixel value in the object and an (n=1 to 41) indicates a pixel value in the background. Before the processing, all pixel values an in the background are equal to a pixel average value a.

First, the values of background pixels a1 to a9 in contact with pixels in the object region in any of the upper, lower, left, and right portions are replaced with average values of the values of the contacting object pixels xn and their own pixel values. For example, the background pixel a1 is replaced with "(a1+x1)/2", and the background pixel a3 is replaced with "(a3+x2+x3)/3".

Subsequently, the background pixels a10 to a17 in contact with the background pixels a1 to a9 are similarly replaced. As an example, a10 is replaced with "(a10+a1)/2". As the background pixel a1, the previously replaced value is used.

Likewise, the background pixels a18 to a24 are sequentially replaced. As a consequence, the steps of pixel values in the boundary between the object and the background are decreased.

When pixel values are altered as described above, the average value of the block changes. Therefore, pixel values in the background portion can also be corrected so that the original block average value remains unchanged. This correction is to add or subtract a predetermined value to or from all pixels in the background or to alter pixel values in the background far from the boundary in a direction opposite to the luminance direction in which pixel values close to the boundary are altered.

When pixel values in the object are altered, a picture close to an input picture can be obtained by restoring the portion before the alteration after the picture is decoded. For example, in the above method in which compression is performed around the average value, alteration is done as follows assuming that a decoded value of a pixel compressed in encoding is yd and a pixel value after the alteration is xd: where ad is the average value of the object or the background of the decoded picture or the average value of the whole block. Although yd often takes a value somewhat different from y due to an encoding/decoding distortion, xd close to x can be obtained by this alteration.

Figure 21:
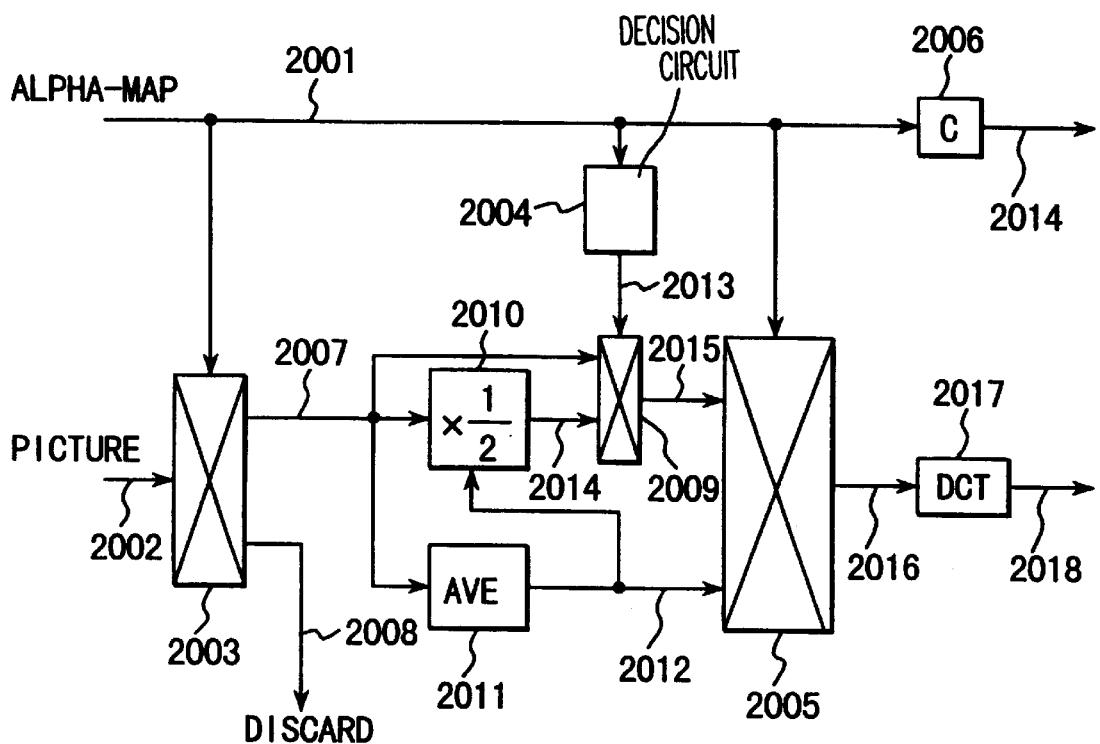
FIG. 21 is a block diagram showing an example of an encoding apparatus as still another modification of the second embodiment of the present invention.

According to the encoding apparatus of the above modifications, as shown in FIG. 21, a picture signal is input to the input terminal of a switch 2003 one output terminal of which is connected to a switch 2009, a compressor 2010 and an average circuit 2011. The output terminal of the compressor 2010 is connected to the other input terminal of the switch 2009. The output terminal of the switch 2005 is connected to the switch 2005. The output terminal of the average circuit 2011 is connected to the compressor 2010 and the switch 2005.

A decision circuit 2004 receives an alpha-map signal and the output terminal of the decision circuit 2004 is connected to the control terminal of the switch 2009. An encoder 2006 receives the alpha-map signal and a DCT circuit 2017 receives a signal selected by the switch 2005.

In the encoding apparatus constructed as described above, the encoder 2006 encodes an externally input alpha-map signal 2001. The switch 2003 receives the alpha-map signal 2001 and a picture signal 2002. On the basis of the alpha-map signal 2001, the switch 2003 divides the picture signal 2002 into an object picture 2007 and a background picture 2008 and discards the background picture 2008. "Discarding" does not necessarily mean "sending the picture to some other place" but simply means that the picture is left unused after that.

The decision circuit 2004 decides on the basis of the alpha-map signal 2001 whether an interest pixel which is a pixel currently being processed in the object picture 2007 supplied via the switch 2003 is in contact with the background. The decision circuit 2004 supplies a decision result 2013 to the switch 2009.

The average circuit 2011 calculates an average value 2012 of the object picture 2007 supplied via the switch 2003 and outputs the average value 2012 to the compressor 2010 and the switch 2005. The compressor 2010 compresses the amplitude of the object picture 2007 around the average value 2012 to obtain a compressed picture 2014 and outputs the compressed picture 2014 to the switch 2009.

The switch 2009 receives the compressed picture 2014 and the object picture 2007 from the switch 2003 and refers to the decision result 2013 from the decision circuit 2004. If the interest pixel is a pixel in a portion in contact with the background, the switch 2009 selectively outputs the compressed picture 2014 as an encoded picture 2015 of the object. If the interest pixel is not in contact with the background, the switch 2009 selectively outputs the object picture 2007 as the encoded picture 2015 of the object.

The switch 2005 receives the alpha-map signal 2001, the encoded picture 2015 of the object supplied from the switch 2009, and the average value 2012 calculated by the average circuit 2011. On the basis of the input alpha-map signal 2001, if the interest pixel which is a pixel currently being processed is the object, the switch 2005 selectively outputs the encoded picture 2015 of the object as an encoded picture 2016. If the interest pixel is the background, the switch 2005 selectively outputs the average value 2012 as the encoded picture 2016.

The DCT circuit 2017 performs DCT for the output encoded picture 2016 from the switch 2005 and outputs a transform coefficient 2018.

In the encoding apparatus with the above configuration, the alpha-map signal 2001 and the picture signal 2002 are externally input. The alpha-map signal 2011 is supplied to the switch 2003, the decision circuit 2004, the switch 2005, and the encoder 2006. The picture signal 2002 is supplied to the switch 2003.

On the basis of the input alpha-map signal 2001, the switch 2003 divides the picture signal 2002 into the object picture 2007 and the background picture 2008 and discards the background picture 2008. As described previously, "discarding" does not necessarily mean "sending the picture to some other place" but simply means that the picture is left unused after that.

The object picture 2007 separated by the switch 2003 is supplied to the switch 2009, the compressor 2010, and the average circuit 2011. The average circuit 2011 calculates the average value 2012 of the object picture and supplies the average value 2012 to the compressor 2010 and the switch 2005. The compressor 2010 compresses the amplitude of the object picture 2007 around the average value 2012 and supplies the compressed picture 2014 obtained by this compression to the switch 2009.

The decision circuit 2004 which has received the alpha-map signal 2001 decides whether an interest pixel which is a pixel currently being processed is in contact with the background, and supplies the decision result 2013 to the switch 2009. If the decision result 2013 from the decision circuit 2004 indicates that the interest pixel is in contact with the background, the switch 2009 selectively outputs the compressed picture 2014 as the encoded picture 2015 of the object. If the interest pixel is not in contact with the background, the switch 2009 selectively outputs the object picture 2007 as the encoded picture 2015 of the object.

The output encoded picture 2015 of the object from the switch 2009 is supplied to the switch 2005. The switch 2005 refers to the alpha-map signal 2001 and, if the interest pixel is the object, selectively outputs the encoded picture 2015 of the object as the encoded picture 2016. If the interest pixel is the background, the switch 2009 selectively outputs the average value 2012 as the encoded picture 2016.

The encoded picture 2016 output from the switch 2005 is supplied to the DCT circuit 2017. The DCT circuit 2017 performs DCT for the encoded picture 2016 to obtain the transform coefficient 2018 and outputs the transform coefficient 2018 to the outside. The alpha-map signal 2001 is encoded by the encoder 2006 and output to the outside as an alpha-code 2019.

Note that there is another method in which an alpha-map is encoded before a picture is encoded and the decoded signal is input to the switches 2003 and 2005 and the decision circuit 2004. If a distortion occurs in encoding and decoding of an alpha-map, the alpha-map signals on the encoding and decoding sides can be made equal by this method.

Figure 22:
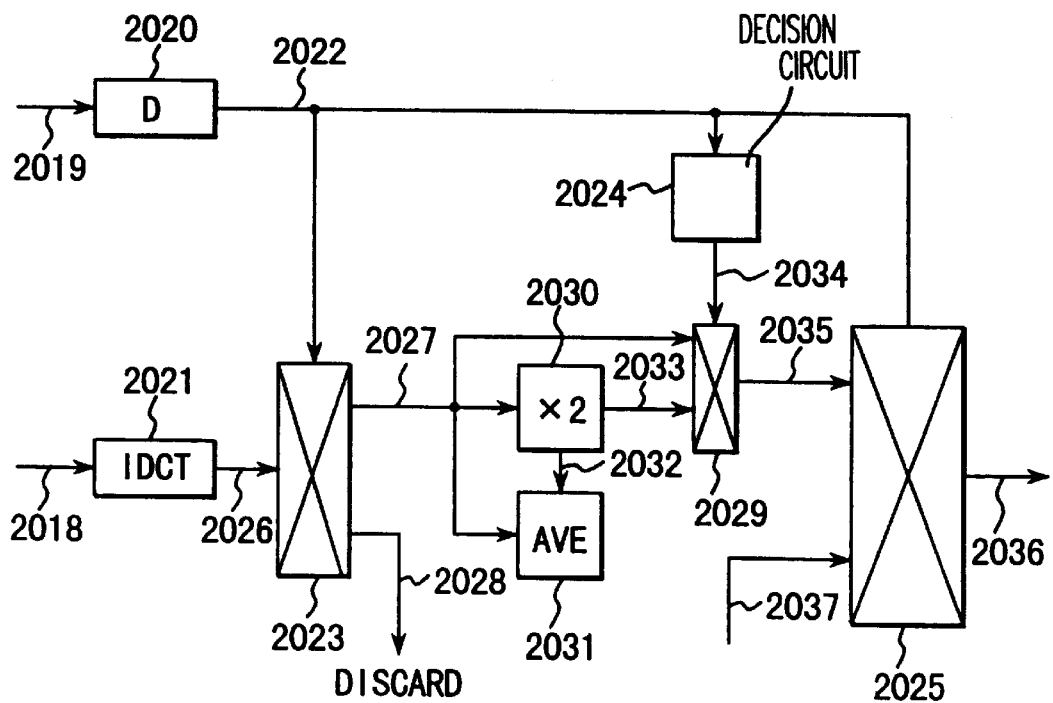
FIG. 22 is a block diagram showing an example of a decoding apparatus as still another modification of the second embodiment of the present invention.

FIG. 22 shows a decoding apparatus as a counterpart of the encoding apparatus in FIG. 21. According to this decoding apparatus, a decoder 2020 receives an encoded alpha-map signal. The output terminal of the decoder 2020 is connected to control terminals of switches 2023 and 2025 and a decision circuit 2024. An inverse DCT circuit 2021 receives transform efficient 2018 of the encoded picture. The output terminal of the inverse DCT circuit 2021 is connected to a decompressor 2030 and an average circuit 2031. The output terminal of the decompressor 2030 is connected to a switch 2029 together with the output terminal of the switch 2023. The switch 2029 is connected to a switch 2036.

In the decoding apparatus as described above, the decoder 2020 receives the externally input alpha-code 2019, decodes the alpha-code 2019, and supplies a decoded alpha-map signal 2022 to the switch 2023, the decision circuit 2024, and the switch 2025. The inverse DCT circuit 2021 performs inverse DCT for the externally input transform coefficient 2018 to decode a picture and supplies the picture obtained by the decoding, i.e., a decoded picture 2026, to the switch 2023.

The decision circuit 2024 decides on the basis of the alpha-map signal 2022 decoded by the decoder 2020 whether an interest pixel in an object picture 2027 is in contact with the background. The decision circuit 2024 outputs a decision result 2034 to the switch 2029.

On the basis of the alpha-map signal 2022 decoded by the decoder 2020, the switch 2023 divides the decoded picture 2026 supplied from the inverse DCT circuit 2021 into the object picture 2027 and a background picture 2028. The switch 2023 outputs the object picture 2027 to the switch 2029, the decompressor 2030, and the average circuit 2031 and discards the background picture 2028.

The average circuit 2031 calculates an average value 2032 of the object picture 2027 supplied from the switch 2023 and outputs the average value 2032 to the decompressor 2030. The decompressor 2030 expands the amplitude of the object picture 2027 around the average value 2032 to obtain an expanded picture 2033 and outputs the expanded picture 2033 to the switch 2029.

Of the object picture 2027 and the expanded picture 2033 thus input, the expanded picture 2033 is selectively output as a decoded picture 2035 of the object from the switch 2029 to the switch 2025, if the output decision result 2034 from the decision circuit 2033 indicates that the interest pixel is in contact with the background. If the interest pixel is not in contact with the background, the switch 2029 selectively outputs the object picture 2027 as the decoded picture 2035 of the object to the switch 2025.

The switch 2025 receives the decoded picture 2035 of the object and a signal 2037 which is separately input as the background, and refers to the alpha-map signal 2022. If the interest pixel is the object, the switch 2025 selectively outputs the decoded picture 2035 of the object as a reconstructed picture 2036 to the outside. If the interest pixel is the background, the switch 2025 selectively outputs the signal 2037 as the reconstructed picture 2036 to the outside.

In the decoding apparatus with the above configuration, the alpha-code 2019 and the transform coefficient 2018 are externally input. The alpha-code 2019 is supplied to the decoder 2020, and the transform coefficient 2018 is supplied to the inverse DCT circuit 2021.

The decoder 2020 decodes the alpha-map signal 2022 and outputs the decoded signal to the switch 2023, the decision circuit 2024, and the switch 2025. The inverse DCT circuit 2021 decodes the picture and supplies the decoded picture 2026 to the switch 2023.

On the basis of the alpha-map signal 2022 decoded by the decoder 2020, the switch 2023 divides the decoded picture 2026 into the object picture 2027 and the background picture 2028 and discards the background picture 2028. The object picture 2027 separated by the switch 2023 is supplied to the switch 2029, the expander 2030, and the average circuit 2031.

The average circuit 2031 calculates the average value 2032 of the object picture 2027 and supplies the average value 2032 to the expander 2030.

The expander 2030 expands the amplitude of the object picture 2027 around the average value 2032 and supplies the expanded picture 2033 thus obtained to the switch 2029.

The decision circuit 2024 decides whether an interest pixel in the object picture 2027 is in contact with the background and supplies the decision result 2034 to the switch 2029. If the decision result 2034 indicates that the interest pixel is in contact with the background, the switch 2029 selectively outputs the expanded picture 2033 as the decoded picture 2035 of the object. If the interest pixel is not in contact with the background, the switch 2029 selectively outputs the object picture 2027 as the decoded picture 2035 of the object.

The output decoded picture 2035 of the object from the switch 2029 is supplied to the switch 2025. The switch 2025 refers to the alpha-map signal 2022 and, if the interest pixel which is a pixel currently being processed is the object, outputs the decoded picture 2035 of the object as the reconstructed picture 2036 to the outside. If the interest pixel is the background, the switch 2029 selectively outputs the signal 2037, which is separately input as the background, as the reconstructed picture 2036. Note that a reconstructed signal of a background picture which is separately encoded or a predetermined pattern is used as the background signal 2037.

The foregoing are examples of the processing of decreasing the step.

The examples of the processing of decreasing the step have been described above, and a description will return to the subject of the second embodiment.

As already described above, the arbitrary shape orthogonal transform circuit 101 refers to the alpha-map signal, checks the interest region of the picture, divides the interest region of the picture into square blocks each consisting of N×N pixels, and orthogonally transforms each block to obtain N×N transform coefficients.

For a block containing the boundary between the object and the background, a transform coefficient for the object and a transform coefficient for the background are calculated. These transform coefficients are supplied to adders 110 and 111 for the enhancement layer and the base layer, respectively.

Upon receiving the transform coefficient, the adder 111 of the base layer calculates a prediction error signal between this transform coefficient and a motion compensation prediction value (BMC) which is converted into an orthogonal transform coefficient and supplied from the motion compensation prediction section 601. The adder 111 supplies the result to a quantizer 131. The quantizer 131 quantizes the prediction error signal in accordance with the quantization scale Q_scale supplied from the encoding controller 430 and supplies the quantized signal to the variable-length encoder 141 and a dequantizer 171.

The variable-length encoder 141 performs variable-length encoding for the quantized prediction error signal. The variable-length encoder 141 also performs variable-length encoding for the side information such as the mode information containing the quantization scale information supplied from the encoding controller 430 and the motion vector supplied from the motion vector detector 510.

These variable-length codes obtained by the variable-length encoder 141 are supplied to the multiplexer 155. The multiplexer 155 multiplexes these variable-length codes together with an alpha-code 55 which is encoded and supplied to the multiplexer 155. The multiplexer 155 outputs the multiplexed signal to the output buffer 161.

The output buffer 161 outputs the multiplexed signal as an encoded bit stream 21 to a transmission line or a storage medium and also feeds the capacity of the buffer back to the encoding controller 430. In accordance with this buffer capacity, the encoding controller 430 generates the optimum quantization scale Q_scale.

The quantized value of the prediction error signal supplied to the dequantizer 171 is dequantized by the dequantizer 171. The adder 191 adds the dequantized value to the motion compensation prediction value (BMC), thereby calculating a reconstructed value in the transform coefficient domain. The reconstructed value is supplied to the motion compensation prediction section 601.

In the enhancement layer, a selector 300 performs selection on the basis of the value of an output (BQ) from the quantizer 131 in the base layer. That is, the selector 300 adaptively switches the output (EMC) from the motion compensation prediction section 600 in the enhancement layer and the output (BMC) from the motion compensation prediction section 601 in the base layer for each transform coefficient by using a method to be described later and outputs the selected input as EP.

More specifically, the output (BQ) from the quantizer 131 in the base layer is supplied to a binarizing circuit 310. If the value of BQ is "0", the binarizing circuit 310 outputs "0" to the selector 300. If the value is not "0", the binarizing circuit 310 output "1" to the selector 300.

If the output from the binarizing circuit 310 is "0", the selector selectively outputs EMC as EP. If the output is BMC, the selector 300 selectively outputs BMC as EP. Consequently, the transform coefficient output EMC from the motion compensation prediction section 600 in the enhancement layer is applied to a transform coefficient in a position where the output BQ from the quantizer 131 is "0", and the transform coefficient output BMC from the motion compensation prediction section 601 in the base layer is applied to a transform coefficient in a position where the output BQ from the quantizer 131 is not "0".

The quantizer 131 in the base layer receives and quantizes the output from the adder 111. The adder 111 receives the output from the arbitrary-shape orthogonal transform circuit 101 and the motion compensation prediction value obtained from a picture in an immediately previous frame by the motion compensation prediction section 601 and calculates the difference between them. Therefore, if the motion compensation prediction value is correct, the difference between the two values output from the adder 111 is "0".

Accordingly, of the quantized values as the output BQ from the quantizer 131 in the base layer, coefficients whose values are not "0" are coefficients representing that the motion compensation prediction is incorrect.

If the motion compensation prediction section 600 performs motion compensation prediction by using the same motion vector as in the base layer supplied from the motion vector detector 510, it is estimated that motion compensation prediction for coefficients in the enhancement layer in the same positions as in the base layer is incorrect.

For these coefficients, therefore, the selector 300 selects BMC as the output from the motion compensation prediction section 601 for the base layer.

On the other hand, since it is estimated that motion compensation for other coefficients is correct, the selector 300 selects the prediction value in the enhancement layer with a smaller encoding distortion. Consequently, the signal EC encoded in the enhancement layer is the quantized error signal of the base layer if motion compensation prediction is incorrect, and is the motion compensation prediction error signal of the enhancement layer if motion compensation prediction is correct. This improves the efficiency of encoding for coefficients the motion compensation prediction for which is incorrect.

The adder 110 in the enhancement layer calculates a prediction error signal between the transform coefficient of the input picture supplied from the arbitrary-shape orthogonal transform circuit 101 and the output (EP) from the selector 300 and supplies the result to an adder 121.

The adder 121 receives a dequantized value 30 of BQ supplied from the dequantizer 171. Accordingly, the adder 121 calculates the difference EC between the value 30 and the output from the adder 110 and supplies the difference EC as a prediction error signal to a quantizer 130.

The quantizer 130 quantizes the signal EC by using the quantization scale Q_scale supplied from the encoding controller 420 in accordance with the buffer capacity. The quantizer 130 supplies the quantized output to a variable-length encoder 140 and a dequantizer 170. The variable-length encoder 140 separately performs variable-length encoding for the quantized prediction error signal and the side information such as the mode information supplied from the encoding controller 420 and supplies the variable-length codes to a multiplexer 150.

The multiplexer 150 multiplexes these variable-length codes and supplies the multiplexed signal to the output buffer 160. The output buffer 160 temporarily holds the signal and outputs the signal as an encoded bit stream 20 to a transmission line or a storage medium. Also, the output buffer 160 feeds the capacity of the buffer to the encoding controller 420. Upon receiving the buffer capacity, the encoding controller 420 generates the optimum quantization scale Q_scale corresponding to the capacity and supplies the quantization scale Q_scale to the quantizer 130 and the variable-length encoder 140.

The quantized value supplied from the quantizer 130 to the dequantizer 170 is dequantized. An adder 180 adds the dequantized value to the output 30 supplied from the dequantizer 171 in the base layer, thereby reconstructing the prediction error signal.

The adder 190 adds the prediction error signal reconstructed by the adder 180 to the motion compensation prediction value (EP) supplied from the selector 300, calculating a reconstructed value in the transform coefficient domain. The reconstructed value is supplied to the motion compensation prediction section 600.

FIG. 6A is a block diagram of the motion compensation prediction sections 600 and 601. Each of the motion compensation prediction sections 600 and 601 comprises an arbitrary-shape inverse orthogonal transform circuit 610, a frame memory 620, a motion compensation circuit 630, and an arbitrary shape orthogonal transform circuit 640. The arbitrary shape inverse orthogonal transform circuit 610 inversely orthogonally transforms a reconstructed picture signal as an input signal in accordance with an alpha-map signal. The frame memory 620 temporarily holds the inversely orthogonally transformed signal in units of frames. The motion compensation circuit 630 receives the information of a motion vector, extracts a picture in a position indicated by the motion vector in units of frames, and supplies the extracted picture to the arbitrary-shape orthogonal transform circuit 640. The arbitrary-shape orthogonal transform circuit 640 orthogonally transforms the supplied picture in accordance with the alpha-map signal. In other words, the arbitrary-shape orthogonal transform circuit 640 orthogonally transforms the motion compensation prediction value of an arbitrary shape, thereby obtaining a motion compensation prediction value in a transform coefficient domain.

In this configuration, a reconstructed value in a transform coefficient domain is supplied to the motion compensation prediction sections 600 and 601. The arbitrary-shape inverse orthogonal transform circuit 610 in this motion compensation prediction section inversely transforms the reconstructed value into a reconstructed picture signal in accordance with the alpha-map signal 50 which is separately supplied. The reconstructed picture signal is stored in the frame memory 620.

Of the reference pictures stored in the frame memory 620, a picture in a position indicated by the motion vector is extracted by the motion compensation circuit 630 in the motion compensation prediction section in units of blocks, and the extracted picture is supplied to the arbitrary shape orthogonal transform circuit 640 in the motion compensation prediction section. Upon receiving the blocks of the picture, the arbitrary shape orthogonal transform circuit 640 orthogonally transforms the picture blocks in accordance with the externally supplied alpha-map signal 50, thereby orthogonally transforming the motion compensation prediction value of an arbitrary shape. Consequently, the arbitrary shape orthogonal transform circuit 640 can calculate and output the motion compensation prediction value in the transform coefficient domain. In a block containing the boundary between the object and the background, transform coefficients of both the object and the background are calculated.

From the reconstructed value in the transform coefficient domain, the motion compensation prediction sections 600 and 601 calculate the motion compensation prediction values EMC and BMC in the transform coefficient domain and supplies the values to the selector 300.

The foregoing is the explanation of the encoding apparatus of the second embodiment. The decoding apparatus of the second embodiment will be described below.

Figure 7:
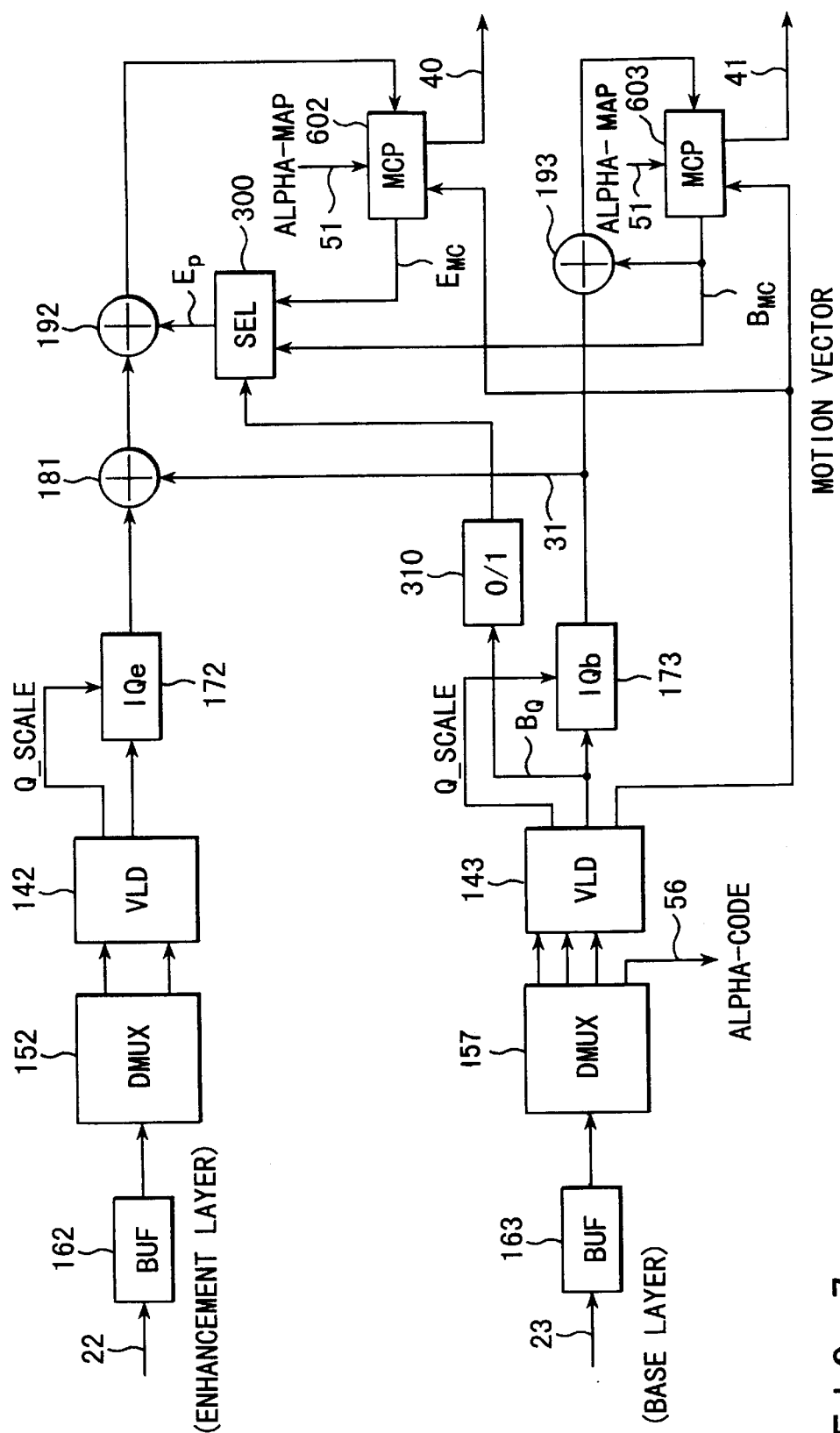
FIG. 7 is a block diagram for explaining the present invention, showing the configuration of a decoding apparatus according to the second embodiment of the present invention.

FIG. 7 is a block diagram of the decoding apparatus of the present invention.

This configuration differs from FIG. 4 in three points; that is, a motion compensation prediction section 602 is provided instead of the motion compensation prediction section 201, a motion compensation prediction section 603 is provided instead of the motion compensation prediction section 203, and a demultiplexer 157 is provided instead of the demultiplexer 153.

Each of the motion compensation prediction sections 602 and 603 performs motion compensation prediction by referring to an alpha-map signal. The demultiplexer 153 demultiplexes a quantized value of a transform coefficient, a motion vector, and side information such as a quantization scale and transfers the demultiplexed signals to the variable-length decoder 143. The demultiplexer 157 additionally has a function of demultiplexing an alpha-code and transferring the demultiplexed codes to an alpha-map decoding apparatus (not shown).

In this configuration, a base layer bit stream 23 which is formed by encoding and multiplexing a quantized value of a transform coefficient, a motion vector, side information such as a quantization scale, and an alpha-code is input to the input stage of the base layer. This bit stream 23 is stored in an input buffer 167 and supplied to the demultiplexer 157.

The demultiplexer 157 demultiplexes the bit stream into the quantized value of the transform coefficient, the motion vector, the side information, and the alpha-code. Of these demultiplexed codes, the quantized value of the transform coefficient, the motion vector, and the side information are supplied to a variable-length decoder 143 and decoded into signals of the quantized value of the transform coefficient, the motion vector, and the quantization scale. Note that a code (alpha-code) 56 of an alpha-map signal is supplied to an alpha-map decoding apparatus (not shown) where the code is converted into the alpha-map signal, and the signal is supplied to the motion compensation prediction sections 602 and 603.

Of the signals decoded by the variable-length decoder 143, the quantized value of the transform coefficient is dequantized by a dequantizer 173 and supplied to an adder 193. The adder 193 adds the dequantized transform coefficient and a motion compensation prediction value in a transform coefficient domain supplied from the motion compensation prediction section 603, thereby calculating a reconstructed value in the transform coefficient domain.

This reconstructed value is supplied to the motion compensation prediction section 603 and inversely transformed into a reconstructed picture signal by an arbitrary-shape inverse orthogonal transform circuit 610. The signal is output as an output reconstructed picture signal 41 and stored in a frame memory 620 (FIG. 6B).

An enhancement layer bit stream 22 formed by encoding and multiplexing signals of a quantized value of a transform coefficient and side information such as a quantization scale is input to the input stage of the enhancement layer. The bit stream 22 is stored in an input buffer 162 and supplied to a demultiplexer 152. The demultiplexer 152 demultiplexes the bit stream into a code of the quantized value of the transform coefficient and a code of the side information.

The codes demultiplexed by the demultiplexer 152 are supplied to a variable-length decoder 142 and decoded into signals of the quantized value of the transform coefficient and the quantization scale. The quantized value of the transform coefficient is dequantized by a dequantizer 172 and supplied to an adder 181. The adder 181 adds this dequantized value to a dequantized value 31 supplied from the dequantizer 173 of the base layer and supplies the sum to an adder 192.

The adder 192 adds the output from the adder 181 and the signal EP supplied from the selector 300 and thereby calculates a reconstructed value in a transform coefficient domain. This reconstructed value is supplied to the motion compensation prediction section 602 and inversely transformed into a reconstructed picture signal by an arbitrary-shape inverse orthogonal transform circuit 610 (FIG. 6B) provided in the motion compensation prediction section 602. The reconstructed picture signal is output as an output reconstructed picture signal 40 and stored in a frame memory 620 provided in the motion compensation prediction section 602.

Of the reference pictures stored in the frame memory 620, a picture in a position indicated by the motion vector is extracted by a motion compensation circuit 630 (FIG. 6B) in the motion compensation prediction section in units of blocks, and the extracted picture is supplied to an arbitrary shape orthogonal transform circuit 640 in the motion compensation prediction section. The arbitrary-shape orthogonal transform circuit 640 orthogonally transforms the motion compensation prediction value of an arbitrary shape in accordance with an externally supplied alpha-map signal 50, thereby calculating and outputting a motion compensation prediction value in a transform coefficient domain. For a block containing the boundary between the object and the background, transform coefficients for both the object and the background are calculated.

In this way, the motion compensation prediction sections 600 and 601 calculate the motion compensation prediction values EMC and BMC in the transform coefficient domain from the reconstructed value in the transform coefficient domain and supplies these values to the selector 300.

One modification of the motion compensation prediction sections 600, 601, 602, and 603 of the second embodiment will be described below with reference to FIGS. 8A and 8B. This modification is accomplished by expanding a background prediction system (e.g., Miyamoto et al.: "Adaptive Predictive Coding System Using Background Prediction", PCSJ88,7-4, pp. 93–94, Watanabe et al.: "Adaptive Four-Difference—DCT Coding System", PCSJ88,8-2, pp. 117–118), which is conventionally used to improve the efficiency of encoding of a background region hidden by the movement of an object, so that the system is also usable to overlapping of objects.

As shown in FIGS. 8A and 8B, the motion compensation prediction section comprises an arbitrary-shape inverse orthogonal transform circuit 610, an SW circuit 650, frame memories 621, 622, and 623, an SW circuit 651, a motion compensation circuit 630, and an arbitrary shape orthogonal transform circuit 640.

The arbitrary-shape inverse orthogonal transform circuit 610 inversely transforms a reconstructed picture signal in accordance with an alpha-map signal. When a reconstructed value in a transform coefficient domain is input to the motion compensation prediction section, this reconstructed value is supplied to the arbitrary-shape inverse orthogonal transform circuit 610 as one component of the motion compensation prediction section. The circuit 610 inversely transforms the reconstructed value into a reconstructed picture signal in accordance with an alpha-map signal. This alpha-map signal is supplied from an alpha-map decoding apparatus (not shown) provided in the decoding system.

The reconstructed picture signal inversely transformed by the arbitrary-shape inverse orthogonal transform circuit 610 is stored in one of the frame memories 621, 622, and 623. The SW circuit 650 selects one of the frame memories 621, 622, and 623 into which the signal is stored. For example, of the frame memories 621, 622, and 623, the frame memories 621 and 622 are used to store object pictures, and the frame memory 623 is used to store background pictures. The object frame memories are prepared for two frames to separately hold pictures of two different objects appearing in a frame. If three or more different objects exist, it is only necessary to prepare the number of object frame memories corresponding to the number of objects and allow the switch circuit 650 to select a corresponding frame memory.

The SW circuit 650 can store the reconstructed picture signal from the arbitrary-shape inverse orthogonal transform circuit 610 in one of the frame memories 621, 622, and 623 in accordance with an alpha-map signal by opening or closing the switch in accordance with the alpha-map signal.

The SW circuit 651 opens or closes the switch in accordance with the alpha-map signal, thereby selecting one of the frame memories 621, 622, and 623 in accordance with the alpha-map signal and reading out the reconstructed picture signal stored in that memory. Of the reconstructed picture signal (reference picture) read out from the frame memory 621, 622, or 623 via the SW circuit 651, the motion compensation circuit 630 extracts a picture in a position indicated by a motion vector in units of blocks and supplies the extracted picture to the arbitrary-shape orthogonal transform circuit 640.

The arbitrary-shape orthogonal transform circuit 640 orthogonally transforms the reconstructed picture signal of the picture in the position indicated by the motion vector, which is read out from the frame memory 621, 622, or 623 via the SW circuit 651, on the basis of the alpha-map signal, thereby orthogonally transforming a motion compensation prediction value of a picture of an arbitrary shape indicated by the alpha-map signal. That is, the circuit 640 calculates and outputs the motion compensation prediction value in the transform coefficient domain.

In the configuration shown in FIGS. 8A and 8B, it is assumed that the alpha-map supplied to the arbitrary-shape inverse orthogonal transform circuit 610 can specify one of a plurality of objects and a background to which a pixel belongs.

In this configuration, a reconstructed value in a transform coefficient domain is supplied to the motion compensation prediction section. A portion of this reconstructed value, i.e., a picture of an arbitrary shape indicated by an alpha-map is inversely orthogonally transformed into a reconstructed picture signal by the arbitrary-shape inverse orthogonal transform circuit 610. The reconstructed picture signal is stored in one of the frame memories 621, 622, and 623 for the objects and the background by the SW circuit 650 in accordance with the alpha-map signal.

These stored signals are sequentially selected and read out by the SW circuit 651 in accordance with the alpha-map signal and supplied to the motion compensation circuit 630 where a motion compensation prediction value is calculated.

As described above, to calculate the motion compensation prediction value in the motion compensation circuit 630, the SW circuit 651 forms the motion compensation prediction value from the reference pictures stored in the frame memories. This improves the efficiency of encoding of a region which is hidden by overlapping of objects.

The motion compensation prediction value calculated by the motion compensation circuit 630 is supplied to the arbitrary-shape orthogonal transform circuit 640 and orthogonally transformed on the basis of the alpha-map signal. The result is an orthogonal transform coefficient of the motion compensation prediction value of the picture of the arbitrary shape indicated by the alpha-map signal.

In this modification as described above, to obtain the motion compensation prediction value in the motion compensation circuit 630, the motion compensation prediction value is formed for each of pictures stored in the frame memories which separately store pictures of the objects and the background in accordance with an alpha-map signal. This improves the efficiency of encoding of a region hidden by overlapping of the objects.

Other configurations of the quantizers 130 and 131 and the dequantizers 170, 171, 172, and 173 in the first and second embodiments will be described below with reference to FIGS. 2 and 9 to 11.

Quantization matrices shown in FIGS. 9 and 10 are described in TM5 as a test model of MPEG2. In each of FIGS. 9 and 10, the matrix is represented by a two-dimensional matrix in a horizontal direction (h) and a vertical direction (v) with respect to 8×8 transform coefficients.

The following equations show examples of quantization and dequantization using the quantization matrices in FIGS. 9 and 10.

Quantization:

$$\text{level}(v,h) = \text{sign}(\text{coef}(v,h)) * |\text{coef}(v,h)| * (v,h)/(2*Q\_\text{scale}) \quad (1)$$

Inverse quantization:

$$\text{coef'}(v,h) = \text{sing}(\text{level}(v,h))(2*|\text{level}(v,h)| * e(v,h)/16+1) * Q\_\text{scale} \quad (2)$$

where coef(v,h): transform coefficient level(v,h): quantized value coef'(v,h): transform coefficient (reconstructed value)

w(v,h): quantization matrix

Q_scale: quantization scale

The modification is related to a quantization matrix for changing the weight of a quantization step size for each transform coefficient. In the SNR scalability, quantization in the enhancement layer is performed more finely than in the base layer.

In the base layer, therefore, the quantization matrices as shown in FIGS. 9 and 10 are used to finely quantize low-frequency transform coefficients and roughly quantize high-frequency coefficients. If this is the case, the subjective evaluation often improves when encoding is performed at the same encoding rate as when encoding is performed with a fixed quantization step size. Also, the coding efficiency is increased by increasing the occurrence probability of 0 by enlarging the center dead zone in a quantizer. This improves the quality of reconstructed pictures at low rates.

In the enhancement layer, on the other hand, if high-frequency transform coefficients are roughly quantized, no fine textures are reconstructed to result in visual degradation. This also increases the influence of feedback quantization noise in high-frequency transform coefficients.

Accordingly, in the enhancement layer a quantization matrix is used only for a transform coefficient whose quantized value BQ in the base layer is not "0". FIG. 11 shows an example of a quantization matrix obtained for the example shown in FIG. 2. When this matrix is used, the quantization error of a transform coefficient whose motion compensation prediction error is large is increased in the enhancement layer. However, a quantization error in a largely changing portion is inconspicuous due to the masking effect of visual characteristics, and the resulting visual degradation is little.

An example of transform to a one-dimensional sequence performed when a quantized transform coefficient is variable-length-encoded in the first and second embodiments will be described below with reference to FIGS. 2, 12, and 13. This transform to a one-dimensional sequence is generally done by using a transform method called zigzag scan shown in FIG. 12.

FIG. 12 shows a two-dimensional matrix divided into eight portions in each of a horizontal direction (h) and a vertical direction (v). In FIG. 12, 8×8 transform coefficients are arranged in increasing order of numbers given in measures. Consequently, low-frequency transform coefficients are arranged first and high-frequency transform coefficients are arranged next. Therefore, the larger the ordinal number for a quantized value, the higher the probability of "0", and this increases the coding efficiency when a combined event of the number of 0 runs and quantized values after the 0 runs is variable-length-encoded. This makes use of the properties that a lower-frequency coefficient has a higher electric power.

In this example, therefore, the scan order in the enhancement layer is such that transform coefficients in positions where the quantized value BQ of the base layer is not "0" are arranged before transform coefficients in positions where BQ is "0" so that the transform coefficients are arranged in increasing order of zigzag scan numbers.

That is, a transform coefficient in a position where BQ is "0" is a motion compensation prediction error signal in the enhancement layer, and a transform coefficient in a position where BQ is not "0" is a quantization error in the base layer. Accordingly, the above method is based on the assumption that the statistical properties of the two transform coefficients are different. FIG. 13 shows a scan order corresponding to the example shown in FIG. 2. In FIG. 13, the order of numbers given in measures is the scan order.

In the above example, it is assumed that transform bases do not overlap between blocks. On the other hand, reference: "Ikuzawa et al., Video Encoding Using Motion Compensation Filter Bank Structure, PCSJ92,8-5, 1992" has proposed an encoding method using a motion compensation filter bank structure in which a decrease of the coding efficiency is little even when bases overlap each other because a transformed difference arrangement is used.

The concept of the above reference is applicable to a prediction encoding apparatus (transformed difference arrangement) in an orthogonal transform coefficient domain as in the present invention. Therefore, the motion compensation filter bank structure can be applied to the above example.

In the second embodiment described above, a frame of a video picture is orthogonally transformed by dividing the frame into matrices each having a predetermined number (N×N) of pixels to obtain transform coefficients for individual bands of the spacial frequency, and motion compensation is performed in a transform coefficient domain for each of the N×N transform coefficients in each of upper and lower layers. In this video encoding, motion compensation is performed for a picture in an interest region by using alpha-map information. When this motion compensation is performed, whether motion compensation prediction is correct is checked on the basis of an already decoded and quantized value in the lower layer (base layer). If the motion compensation prediction is correct, encoding in the upper layer (enhancement layer) is performed by using a motion compensation prediction value obtained for the upper layer and having a smaller encoding distortion. If the motion compensation prediction is incorrect, encoding in the upper layer is done by using a motion compensation prediction value obtained for the lower layer (base layer) and having a larger encoding distortion than that in the enhancement layer. This improves the coding efficiency for a coefficient the motion compensation prediction for which is incorrect and realizes an encoding system capable of encoding with little decrease in the coding efficiency.

Accordingly, the resolution and the image quality can be varied in an arbitrary-shape picture encoding apparatus which separately encodes the background and the object. In addition, it is possible to provide scalable encoding and decoding apparatuses having a high coding efficiency.

The third embodiment will be described below with reference to FIG. 14.

As shown in FIG. 14, in blocks (enclosed by the solid lines) containing the boundary between the object and the background, motion vectors are separately detected for the object and the background. Since the number of pixels of either the object or the background decreases, the influence of noise increases, and this decreases the reliability of the motion vector.

In blocks in the boundary, therefore, the motion vector detection range is made narrower than that in other blocks (indicated by the broken lines).

Also, the object in a current frame has moved from the object in a reference frame. Therefore, erroneous detection of a motion vector can be reduced by limiting the motion vector search range for the object to the inside of the object in the reference frame. Limiting the search range also has an effect of decreasing the amount of motion vector search calculations. Likewise, a motion vector is calculated from a background portion in the background.

As described above, a large error can be prevented by making the motion vector detection range in blocks in the boundary narrower than that in other blocks (indicated by the broken lines).

Finally, as an application of the present invention, an embodiment of a video transmission system to which the video encoding and decoding apparatuses of the present invention are applied will be described below with reference to FIGS. 15A to 15C.

Figure 15A:
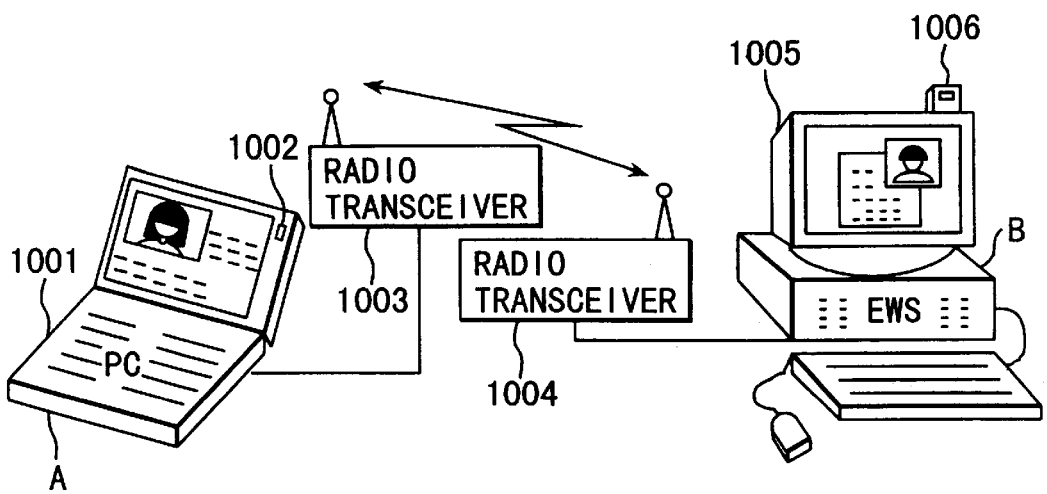
FIGS. 15A, 15B, and 15C are views for explaining an example of a video transmission system to which the video encoding apparatus and the video decoding apparatus according to the present invention are applied.

In this system as shown in FIG. 15A, an input video signal from a camera 1002 of a personal computer (PC) 1001 is encoded by a video encoding apparatus incorporated into the PC 1001. The encoded data output from the video encoding apparatus is multiplexed with other data of sounds or information. The multiplexed data is transmitted by radio from a radio transceiver 1003 and received by another radio transceiver 1004.

The signal received by the radio transceiver 1004 is demultiplexed into the encoded data of the video signal and the data of sounds or information. The encoded data of the video signal is decoded by a video decoding apparatus incorporated into a workstation (EWS) 1005 and displayed on the display of the EWS 1005.

An input video signal from a camera 1006 of the EWS 1005 is encoded in the same fashion as above by using a video encoding apparatus incorporated into the EWS 1005. The encoded data of the video signal is multiplexed with other data of sounds or information. The multiplexed data is transmitted by radio from the radio transceiver 1004 and received by the radio transceiver 1003. The signal received by the radio transceiver 1003 is demultiplexed into the encoded data of the video signal and the data of sounds or information. The encoded data of the video signal is decoded by a video decoding apparatus incorporated into the PC 1001 and displayed on the display of the PC 1001.

Figure 15B:
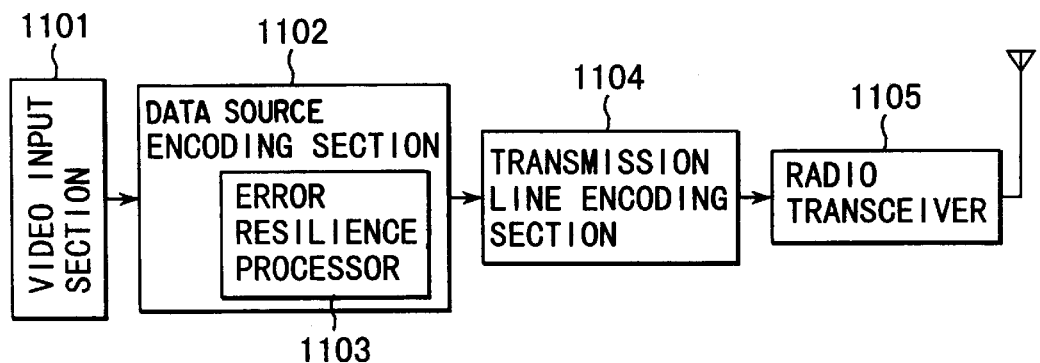

FIG. 15B is a block diagram schematically showing the video encoding apparatus incorporated into the PC 1001 and the EWS 1005 in FIG. 15A. FIG. 15C is a block diagram schematically showing the video decoding apparatus incorporated into the PC 1001 and the EWS 1005 in FIG. 15A.

The video encoding apparatus in FIG. 15B comprises an information source encoding section 1102 which receives a picture signal from a video input section 1101 such as a camera and has an error resilience processor 1103, and a transmission line encoding section 1104. The information source encoding section 1101 performs discrete cosine transform (DCT) for a prediction error signal and quantizes the formed DCT coefficient. The transmission line encoding section 1104 performs variable-length encoding, error detection for encoded data, and error correcting coding. The encoded data output from the transmission line encoding section 1104 is supplied to a radio transceiver 1105 and transmitted. The processing in the data source encoding section 1101 and the variable-length encoding in the transmission line encoding section 1104 is done by applying processing methods such as explained in the embodiments of the present invention.

Figure 15C:
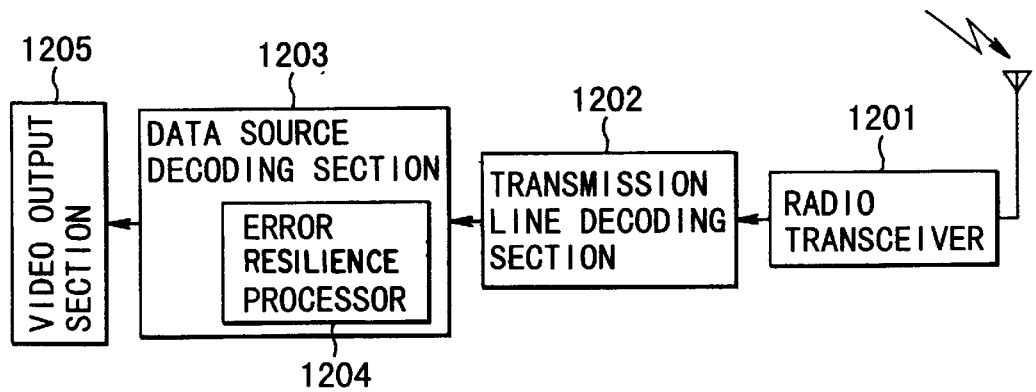

The video decoding apparatus shown in FIG. 15C comprises a transmission line decoding section 1202 and a data source decoding section 1203 having an error resilience processor 1204. The transmission line decoding section 1202 receives encoded data received by a radio transceiver 1201 and performs processing which is the reverse of the processing done by the transmission line encoding section 1104 for the input encoded data. The data source decoding section 1203 receives the output signal from the transmission line decoding section 1202 and performs processing which is the reverse of the processing done by the data source encoding section 1102 for the input signal. The picture decoded by the data source decoding section 1203 is output by a video output section 1025 such as a display.

The decoding processing in these sections is performed by applying processing methods such as explained in the embodiments of the present invention. As has been described above, the present invention accomplishes scalable encoding in which the quality of an arbitrary-shape picture can be varied step by step without largely decreasing the coding efficiency. Also, in the present invention, it is possible to decrease the amount of generated codes when DCT is performed for a picture of an arbitrary shape.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A video encoding apparatus comprising:
   encoder means for encoding an alpha-map signal for discriminating a background of an input signal and at least one object thereof;
   motion compensation prediction encoder means for encoding an arbitrary shape picture of the object in accordance with the alpha-map signal to obtain a coded arbitrary shape picture;
   local decoder means for decoding the coded arbitrary shape picture to reconstruct the arbitrary shape picture of the object and output a reconstructed picture signal representing the object;
   first memory means for storing a background signal representing the background of the input signal; and
   second memory means for storing the reconstructed picture signal, the reconstructed picture signal being read out from the second memory means to be used for motion compensation prediction encoding of the arbitrary shape picture of the object.

2. A video encoding apparatus according to claim 1, further comprising write switch means for selectively switching the first memory means and the second memory means in accordance with the alpha-map signal to store selectively the reconstructed picture signal and the background signal therein.

3. A video encoding apparatus according to claim 1, further comprising read switch means for selectively switching the first memory means and the second memory means in accordance with the alpha-map signal to read out selectively the reconstructed picture signal and the background signal therefrom.

4. A video encoding apparatus comprising:
   encoder means for encoding an alpha-map signal for discriminating a background of an input signal and a plurality of objects thereof;
   motion compensation prediction encoder means for encoding arbitrary shape pictures of the objects in accordance with the alpha-map signal to obtain a plurality of coded arbitrary shape pictures;
   local decoder means for decoding the coded arbitrary shape pictures to reconstruct the arbitrary shape pictures of the objects and to output a plurality of reconstructed picture signals representing the objects;
   first memory means for storing a background signal representing the background of the input signal; and
   a plurality of second memory means for storing the reconstructed picture signals, respectively, the reconstructed picture signals being read out from the second memory means to be used for motion compensation prediction encoding of each of the arbitrary shape pictures of the objects.

5. A video encoding apparatus according to claim 4, further comprising write switch means for selectively switching the plurality of second memory means in accordance with the alpha-map signal to selectively store the reconstructed picture signals corresponding to the objects therein.

6. A video encoding apparatus according to claim 4, further comprising read switch means for selectively switching the second memory means in accordance with the alpha-map signal to read out the reconstructed picture signals corresponding to the objects therefrom.

7. A video encoding apparatus according to claim 4, further comprising:
   motion compensation prediction means for calculating a motion compensation prediction value on the basis of readout one of the reconstructed picture signals and motion vector information input to the motion compensation prediction means; and
   transform means for orthogonally transforming the motion compensation prediction value on the basis of the alpha-map signal to obtain an orthogonal transform coefficient of the motion compensation prediction value of a picture of the arbitrary shape indicated by the alpha-map signal.

8. A video encoding apparatus according to claim 7, wherein the motion compensation prediction means includes calculating means for calculating the motion compensation prediction value for each of the reconstructed picture signals stored in the second memory means in accordance with the alpha-map signal.

9. A video encoding apparatus comprising:
   an encoder configured to encode an alpha-map signal for discriminating a background of an input signal and at least one object thereof;
   a motion compensation prediction encoder configured to encode an arbitrary shape picture of the object in accordance with the alpha-map signal to obtain a coded arbitrary shape picture;
   a local decoder configured to decode the coded arbitrary shape picture to reconstruct the arbitrary shape picture of the object and output a reconstructed picture signal representing the object;
   a first memory configured to store a background signal representing the background of the input signal; and
   a second memory configured to store the reconstructed picture signal, the reconstructed picture signal being read out from the second memory to be used for motion compensation prediction encoding of the arbitrary shape picture of the object.

10. A video encoding apparatus according to claim 9, further comprising a write switch section configured to selectively switch the first memory and the second memory in accordance with the alpha-map signal to store selectively the reconstructed picture signal and the background signal therein.

11. A video encoding apparatus according to claim 9, further comprising a read switch section configured to selectively switch the first memory and the second memory in accordance with the alpha-map signal to read out selectively the reconstructed picture signal and the background signal therefrom.

12. A video encoding apparatus comprising:
   an encoder configured to encode an alpha-map signal for discriminating a background of an input signal and a plurality of objects thereto;
   a motion compensation prediction encoder configured to encode arbitrary shape pictures of the objects in accordance with the alpha-map signal to obtain a plurality of coded arbitrary shape pictures;
   a local decoder configured to decode the coded arbitrary shape pictures to reconstruct the arbitrary shape pictures of the objects and to output a plurality of reconstructed picture signals representing the objects;
   a first memory configured to store a background signal representing the background of the input signal; and
   a plurality of second memories configured to store the reconstructed picture signals, respectively, the reconstructed picture signals being read out from the second memories to be used for motion compensation prediction encoding of each of the arbitrary shape pictures of the objects.

13. A video encoding apparatus according to claim 12, further comprising a write switch section configured to selectively switch the second memories in accordance with the alpha-map signal to selectively store the reconstructed picture signals corresponding to the objects therein.

14. A video encoding apparatus according to claim 12, further comprising a read switch section configured to selectively switch the second memories in accordance with the alpha-map signal to read out the reconstructed picture signals corresponding to the objects therefrom.

15. A video encoding apparatus according to claim 12, further comprising:
   a motion compensation prediction section configured to calculate a motion compensation prediction value on the basis of the readout of one of the reconstructed picture signals and motion vector information input to the motion compensation prediction section; and
   a transform section configured to orthogonally transform the motion compensation prediction value on the basis of the alpha-map signal to obtain an orthogonal transform coefficient of the motion compensation prediction value of a picture of the arbitrary shape indicated by the alpha-map signal.

16. A video encoding apparatus according to claim 15, wherein the motion compensation prediction section includes a section configured to calculate the motion compensation prediction value for each of the reconstructed picture signals stored in the second memories in accordance with the alpha-map signal.

17. A video encoding method comprising:
   encoding an alpha-map signal for discriminating a background of an input signal and at least one object thereof;
   encoding an arbitrary shape picture of the object in accordance with the alpha-map signal to obtain a coded arbitrary shape picture;
   decoding the coded arbitrary shape picture to reconstruct the arbitrary shape picture of the object and output a reconstructed picture signal representing the object;
   storing a background signal representing the background of the input signal in a first memory;
   storing the reconstructed picture signal in a second memory;
   selectively switching the first memory and the second memory in accordance with the alpha-map signal to store selectively the reconstructed picture signal and the background signal therein; and
   reading the reconstructed picture signal out from the second memory to be used for motion compensation prediction encoding of the arbitrary shape picture of the object.

18. A video encoding method comprising:
   encoding an alpha-map signal for discriminating a background of an input signal and at least one object thereof;
   encoding an arbitrary shape picture of the object in accordance with the alpha-map signal to obtain a coded arbitrary shape picture;
   decoding the coded arbitrary shape picture to reconstruct the arbitrary shape picture of the object and output a reconstructed picture signal representing the object;
   storing a background signal representing the background of the input signal in a first memory;
   storing the reconstructed picture signal in a second memory;
   selectively switching the first memory and the second memory in accordance with the alpha-map signal to read out selectively the reconstructed picture signal and the background signal therefrom; and
   reading the reconstructed picture signal out from the second memory to be used for motion compensation prediction encoding of the arbitrary shape picture of the object.

19. A video encoding method comprising:
   encoding an alpha-map signal for discriminating a background of an input signal and a plurality of objects thereof;
   encoding an arbitrary shape picture of the objects in accordance with the alpha-map signal to obtain a plurality of coded arbitrary shape pictures;
   decoding the coded arbitrary shape pictures to reconstruct the arbitrary shape pictures of the objects and to output a plurality of reconstructed picture signals representing the objects;
   storing the background signal in a first memory;
   storing the reconstructed picture signals in at least one of second memories;
   selectively switching the second memories in accordance with the alpha-map signal to selectively store the reconstructed picture signals corresponding to the objects therein; and
   reading the reconstructed picture signals out from the at least one of second memories to be used for motion compensation prediction encoding of each of the arbitrary shape pictures of the objects.

20. A video encoding method comprising:
   encoding an alpha-map signal for discriminating a background of an input signal and a plurality of objects thereof;
   encoding an arbitrary shape picture of the objects in accordance with the alpha-map signal to obtain a plurality of coded arbitrary shape pictures;
   decoding the coded arbitrary shape pictures to reconstruct the arbitrary shape pictures of the objects and to output a plurality of reconstructed picture signals representing the objects;

storing the background signal in a first memory;

storing the reconstructed picture signals in at least one of second memories;

selectively switching the second memories in accordance with the alpha-map signal to read out the reconstructed picture signals corresponding to the objects therefrom; and reading the reconstructed picture signals out from the at least one of second memories to be used for motion compensation prediction encoding of each of the arbitrary shape pictures of the objects.

21. A video encoding method comprising:

encoding an alpha-map signal for discriminating a background of an input signal and a plurality of objects thereof;

encoding an arbitrary shape picture of the objects in accordance with the alpha-map signal to obtain a plurality of coded arbitrary shape pictures;

decoding the coded arbitrary shape pictures to reconstruct the arbitrary shape pictures of the objects and to output a plurality of reconstructed picture signals representing the objects;

storing the background signal in a first memory;

storing the reconstructed picture signals in at least one of second memories;

reading the reconstructed picture signals out from the at least one of second memories to be used for motion compensation prediction encoding of each of the arbitrary shape pictures of the objects;

calculating a motion compensation prediction value based on the reading step and motion vector information; and orthogonally transforming the motion compensation prediction value on the basis of the alpha-map signal to obtain an orthogonal transform coefficient of the motion compensation prediction value of a picture of the arbitrary shape indicated by the alpha-map signal.

22. A video encoding method according to claim 21, wherein the step of encoding arbitrary shape pictures includes calculating the motion compensation prediction value for each of the reconstructed picture signals stored in the second memories in accordance with the alpha-map signal.

* * * * *